US009760072B2

(12) United States Patent
Hall et al.

(10) Patent No.: US 9,760,072 B2
(45) Date of Patent: *Sep. 12, 2017

(54) SECURE REMOTE OPERATION AND ACTUATION OF UNMANNED AERIAL VEHICLES

(71) Applicants: David R. Hall, Provo, UT (US); Mark Hall, Springville, UT (US); Craig Boswell, Draper, UT (US)

(72) Inventors: David R. Hall, Provo, UT (US); Mark Hall, Springville, UT (US); Craig Boswell, Draper, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/412,745

(22) Filed: Jan. 23, 2017

(65) Prior Publication Data

US 2017/0144757 A1 May 25, 2017

Related U.S. Application Data

(63) Continuation-in-part of application No. 14/461,166, filed on Aug. 15, 2014, now Pat. No. 9,608,834, (Continued)

(51) Int. Cl.
*G05B 15/02* (2006.01)
*G08B 25/00* (2006.01)
(Continued)

(52) U.S. Cl.
CPC ............ *G05B 15/02* (2013.01); *B64C 39/024* (2013.01); *G05D 1/0022* (2013.01); (Continued)

(58) Field of Classification Search
CPC ..... H04L 12/2803; H04L 41/22; H04L 41/28; G05B 15/02; G06F 3/04847; G08B 25/008; G08B 25/10; G08C 17/02; H04N 7/18; G05D 1/0022; G05D 1/0027; B64C 2201/024; B64C 2201/06;
(Continued)

(56) References Cited

U.S. PATENT DOCUMENTS

| 4,614,945 A * | 9/1986 | Brunius | ................. | G01D 4/006 |
| | | | | 340/505 |
| 7,498,936 B2 * | 3/2009 | Maeng | ................... | G08B 21/24 |
| | | | | 340/10.3 |

(Continued)

*Primary Examiner* — Ali Neyzari

(57) ABSTRACT

A secure remote operation and actuation system is described herein. The system may comprise one or more unmanned aerial vehicles, a remote input receptor, and a network. In some embodiments, the unmanned aerial vehicles form a collective remote unmanned aerial vehicle. The remote input receptor may comprise a user interface for receiving user inputs from a user. The network may comprise a combination of computer systems interconnected by telecommunications equipment or cables allowing information to be exchanged. The network may also comprise a network device for obtaining the user inputs from the remote input receptor. One or more acceptable inputs may be stored on the network. In the present invention, the network device obtains the user inputs from the remote input receptor while the user is using the user interface and then the network compares the user inputs to the acceptable inputs.

20 Claims, 20 Drawing Sheets

Related U.S. Application Data which is a continuation-in-part of application No. 14/323,549, filed on Jul. 3, 2014, and a continuation-in-part of application No. 14/323,618, filed on Jul. 3, 2014, and a continuation-in-part of application No. 14/461,128, filed on Aug. 15, 2014.

(51) Int. Cl.
| | | |
|---|---|---|
| *B64C 39/02* | (2006.01) | |
| *G05D 1/00* | (2006.01) | |
| *H04W 24/04* | (2009.01) | |
| *G08B 25/10* | (2006.01) | |

(52) U.S. Cl.
CPC ......... *G05D 1/0027* (2013.01); *G08B 25/008* (2013.01); *G08B 25/10* (2013.01); *H04W 24/04* (2013.01); *B64C 2201/024* (2013.01); *B64C 2201/06* (2013.01); *B64C 2201/108* (2013.01); *B64C 2201/128* (2013.01); *B64C 2201/146* (2013.01)

(58) Field of Classification Search
CPC ........ B64C 2201/108; B64C 2201/128; B64C 39/024; H04W 24/04
USPC ...................................................... 340/5.22
See application file for complete search history.

(56) References Cited

U.S. PATENT DOCUMENTS

| | | | | |
|---|---|---|---|---|
| 8,331,544 | B2* | 12/2012 | Kraus | G07C 9/00944 340/5.7 |
| 9,608,834 | B2* | 3/2017 | Hall | G05B 15/02 |
| 2016/0004229 | A1* | 1/2016 | Hall | G05B 15/02 700/275 |
| 2016/0004230 | A1* | 1/2016 | Hall | G05B 15/02 700/275 |
| 2016/0050082 | A1* | 2/2016 | Hall | G05B 15/02 715/736 |

* cited by examiner

SECURE REMOTE OPERATION AND ACTUATION OF UNMANNED AERIAL VEHICLES

CROSS REFERENCE TO RELATED APPLICATIONS

This application is a continuation-in-part of U.S. patent application Ser. No. 14/461,166 filed on Aug. 15, 2014, which is a continuation-in-part of U.S. patent application Ser. No. 14/323,549 filed on Jul. 3, 2014; U.S. patent application Ser. No. 14/323,618 filed on Jul. 3, 2014; and U.S. patent application Ser. No. 14/461,128 filed on Aug. 15, 2014; all entitled "Secure Remote Actuation System," the entirety of each incorporated by reference herein. This application is also a continuation-in-part of U.S. patent application Ser. No. 15/400,313 filed Jan. 6, 2016 entitled "An Apparatus for Retrieving Parcels," the entirety of which is incorporated by reference herein.

BACKGROUND OF THE INVENTION

The present invention relates generally to remote actuation systems comprising devices capable of performing remote operations. Examples of typical remote actuation systems include thermostats, which may control heating and cooling devices from a remote location, garage door openers, which may provide remote access to secured areas, and drones, which may be used for various remotely-controlled operations. The remote portions of such devices commonly require a portable power source, such as a battery or photovoltaic cell. It is also typical of such devices to comprise communications means, such as a radio frequency transceiver, to receive and/or relay information.

For example, U.S. Pat. No. 8,331,544 to Kraus et al., which is incorporated herein for all that it discloses, describes a system that remotely operates a door lock. The door lock may be powered by a battery and be configured to send and receive radio frequency signals as part of a mesh network. In such a mesh network, each connected device acts as a communication node that can send and receive packets of information to any other device in the network. The door lock may further comprise a memory module where individual user codes are stored and a logic module to compare user codes to input codes at the door to allow access decisions to be made at the door without transmissions.

Such systems typically require continuing communications over a network that may cause rapid consumption of power. Thus, various attempts have been made to conserve power in 25 such systems. For example, U.S. Pat. No. 4,614,945 to Brunius, et al., which is incorporated herein for all that it discloses, describes communicating information between a plurality of instrument monitoring units to a remotely located data collection unit. The monitoring units are radio frequency transponder circuits that are operatively connected to one or more instruments whose parameters are being monitored. The transponders continuously monitor one or more parameters of the instrument(s) with which they are associated. The transponders collect and accumulate parameter information and/or data from their associated instruments and continually listen for a "wake-up" signal from an interrogate receiver/data collection unit.

Despite these advances in the art, improved means of conserving power in remote actuation systems is desirable.

BRIEF SUMMARY OF THE INVENTION

A secure remote operation and actuation system may comprise one or more unmanned aerial vehicles, a remote input receptor, and a network. In some embodiments, the unmanned aerial vehicles form a collective remote unmanned aerial vehicle. The remote input receptor may comprise a user interface for receiving user inputs from a user. The network may comprise a combination of computer systems interconnected by telecommunications equipment or cables allowing information to be exchanged. The network may also comprise a network device for obtaining the user inputs from the remote input receptor. One or more acceptable inputs may be stored on the network. In the present invention, the network device obtains the user inputs from the remote input receptor while the user is using the user interface and then the network compares the user inputs to the acceptable inputs.

DETAILED DESCRIPTION OF THE INVENTION

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components or UAVs connected together, whether that connection is permanent (e.g., welded) or temporary (e.g., bolted, mechanical), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

Figure 1:
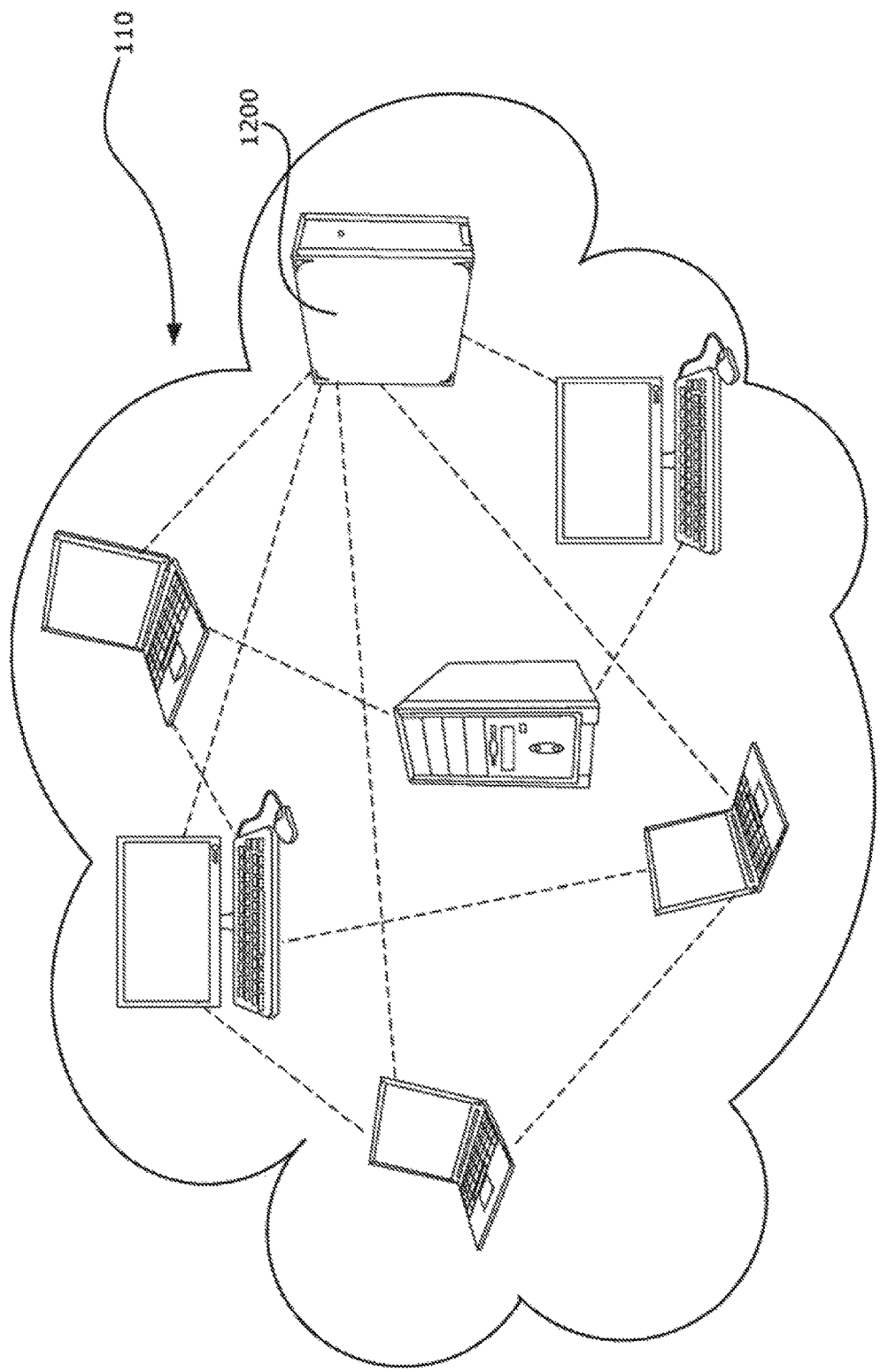
FIG. 1 is a schematic representation of an embodiment of a network device operably 15 connected to a network.

FIG. 1 shows an embodiment of a network device 1200 forming a part of a network 110. The network 110 may comprise a combination of computer systems interconnected by telecommunications equipment or cables allowing information to be exchanged. In various embodiments, network devices may comprise a desktop or laptop computer, a cell phone, a computer server, or other devices capable of communicating on such a network.

Figure 2:
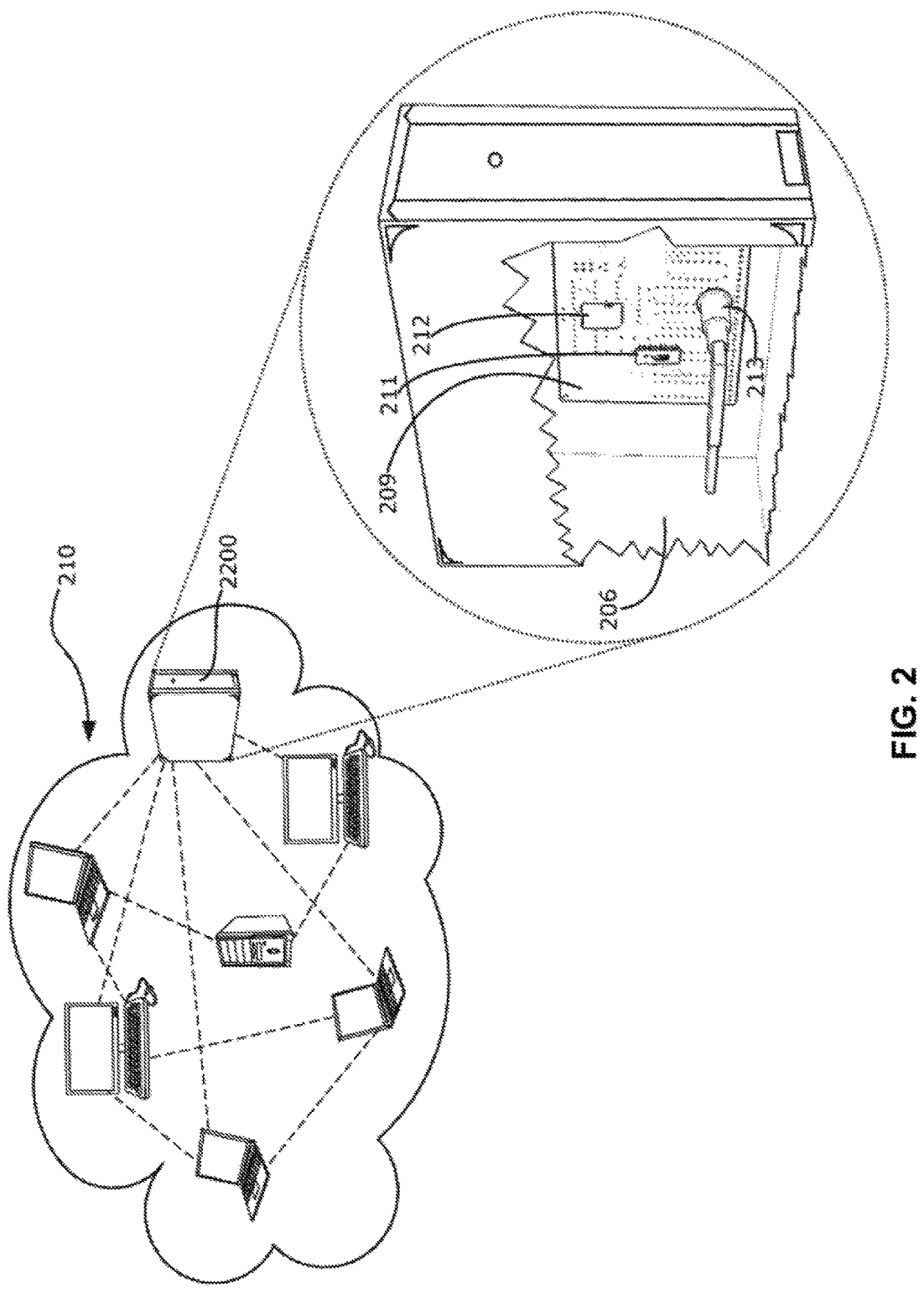
FIG. 2 is a partially cutaway perspective view of an embodiment of a network device forming part of a network, the network device comprising a plurality of components supported by a printed circuit board disposed therein.

FIG. 2 shows an interior 206 of an embodiment of a network device 2200 forming part of a network 210. The network device 2200 may comprise a plurality of components supported by a printed circuit board 209 disposed therein. For instance, the embodiment of the network device 2200 shown comprises a microcontroller 211 and an internal memory unit 212 capable of obtaining and storing one or more user inputs from a remote input receptor (not shown). The network device 2200 may also comprise a communication device 213, such as a radio frequency transceiver, for receiving the one or more user inputs. The radio frequency transceiver may be a universal device capable of communicating with a plurality of other devices by reciprocating various radio frequency transmissions.

Figure 3B:
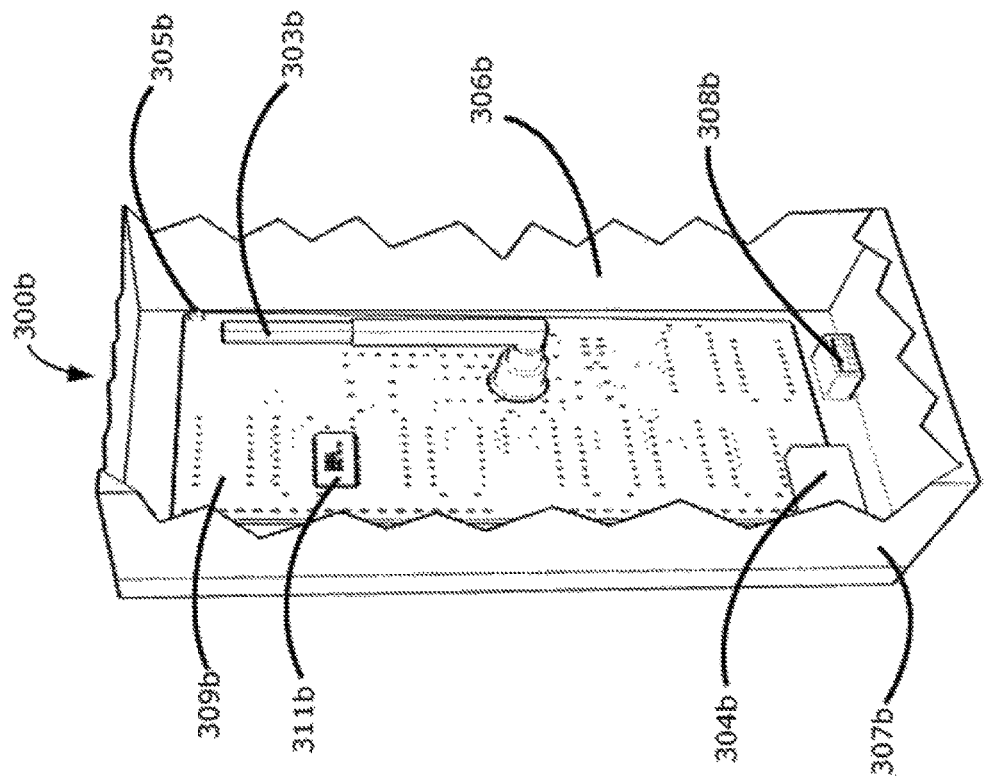
FIGS. 3A-B are perspective and cutaway views of an embodiment of a remote input receptor.
Figure 3A:
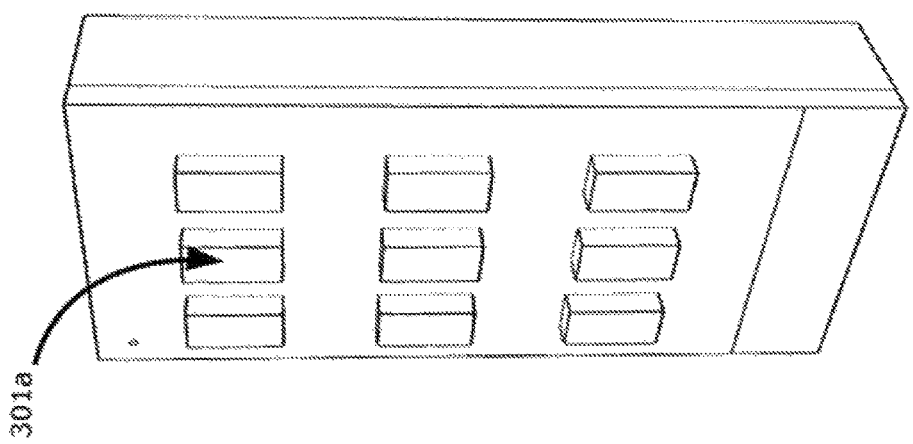

FIGS. 3A-B show a perspective view and a partially-cutaway perspective view, respectively, of an embodiment of a remote input receptor 300b comprising an interface 301a and an interior 306b with a plurality of components supported by a printed circuit board 309b disposed therein.

The printed circuit board 309b may support at least a microcontroller 311b and a communication device 303b. After a user supplies one or more user inputs, the remote input receptor 300b may transmit the one or more user inputs to a network (not shown). The network may store and compare one or more acceptable inputs to the one or more user inputs. If the one or more user inputs correspond with the one or more acceptable inputs, the network may perform an operation.

The communication device 303b may comprise a radio frequency transceiver or other known communication apparatus. The communication device 303b may communicate at a sub-1 GHz frequency. It may be appreciated by those of ordinary skill in the art that communications at sub-1 GHz frequencies may be more capable of propagating through environmental obstacles, such as a plurality of walls in a residential home, than communications at frequencies higher than 1 GHz. It may therefore be desirable for said communication device 303b to transmit signals at a sub-I GHz frequency. In some applications, it may be desirable to communicate at a 2.4 GHz or 5.8 GHz frequency to achieve compatibility with other devices, such as those that communicate using ZigBee, Z-Wave, Bluetooth, or Wi-Fi.

The remote input receptor 300b may be powered by a portable power source 304b, such as one or more galvanic or voltaic batteries, one or more solar cells, or other known means of portable power. The remote input receptor 300b may execute a low power function after a user has submitted a user input to the user interface 301a. Such a low power function may be executed for a predetermined amount of time or until a user starts to use the user interface 301a again. When the low power function is executed, the remote input receptor 300b may cut power from unneeded subsystems and reduce power in others until reactivated. This low power function, combined with not requiring continuous intermittent communication with the network, may enable the portable power source 304b of the remote input receptor 300b to last significantly longer than portable power sources of other known remote actuation systems.

The remote input receptor 300b may further comprise one or more surveillance devices 305b, such as a security camera, a microphone, a proximity sensor, or other known surveillance means. For example, a security camera may be disposed within the interior 306b of the remote input receptor 300b, with a lens of the camera extending through an exterior 307b of the remote input receptor 300b. The one or more security devices 305b may continuously gather and transmit information from an environment to a network (as shown in FIG. 1). Additionally, the one or more surveillance devices 305b may trigger the remote input receptor 300b to exit the low power function when the one or more surveillance devices 305b detect a user.

The remote input receptor 300b may comprise one or more data connection ports 308b for interacting with firmware of the remote input receptor 300b, such as altering or updating the firmware, running system diagnostics, or managing acceptable inputs and/or input parameters. In some embodiments, such firmware functions may also be performed via a network (not shown). The one or more data connection ports 308b may be disposed on the interior 306b of the remote input receptor 300b to aid in preventing undesired access or accumulation of debris from the surrounding environment. The one or more data connection ports 308b may be able to be accessed by detaching a portion of the exterior 307b of the remote input receptor 300b.

Figure 4A:
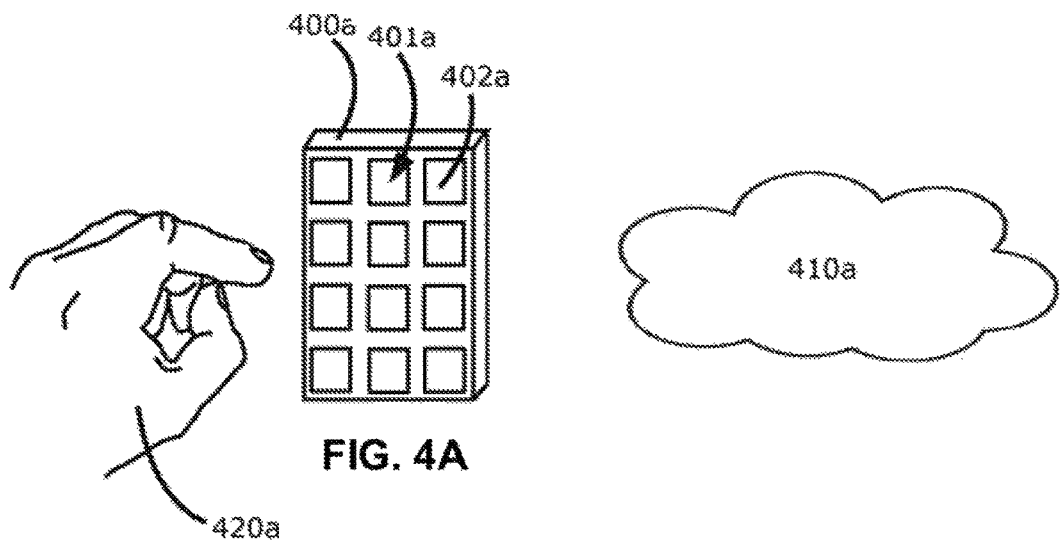
FIGS. 4A-B are perspective views of an embodiment of a portion of a user and a remote input receptor comprising a user interface and operably connected to a network.

FIG. 4A shows an embodiment of a remote input receptor 400a, a network 410a, and a user 420a. The remote input receptor 400a may comprise a user interface 401a for receiving one or more user inputs from the user 420a. The user interface 401a shown comprises one or more buttons 402a. Such user interfaces may also comprise a visual display, one or more capacitive sensors, a microphone, a vibration recognition module, a proximity sensor, a fingerprint scanner, a retina scanner, a voice recognition module, or other known interfacing means.

Figure 4B:
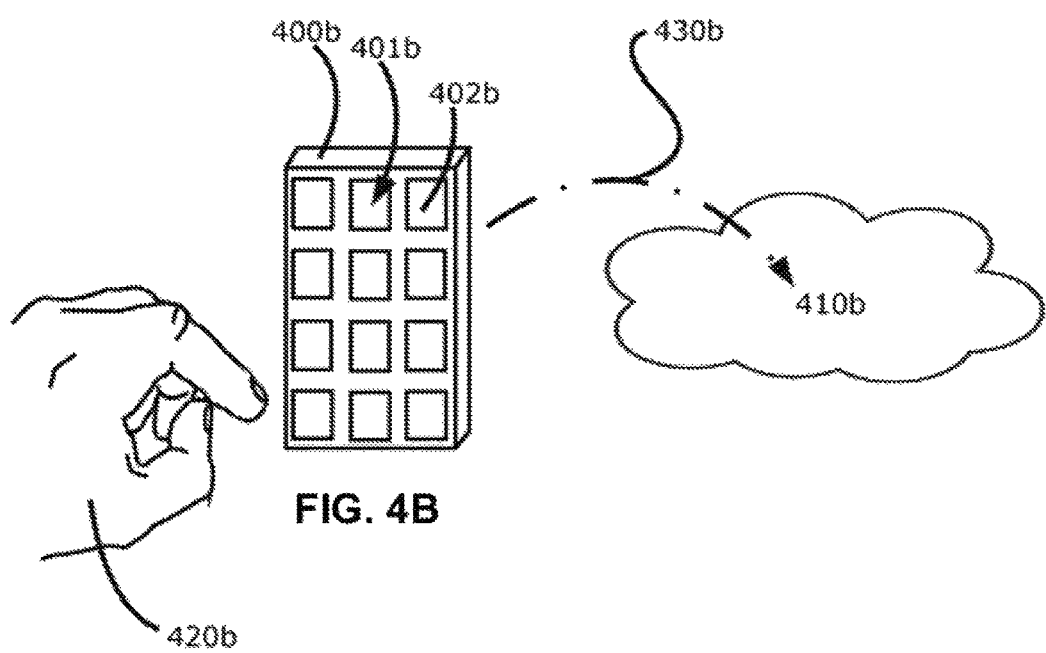

FIG. 4B shows an embodiment of a user 420b supplying one or more user inputs into a remote input receptor 400b by pressing at least one button 402b on a user interface 401b. The one or more user inputs may comprise a keystroke, or any other action receivable by a user interface. As the user 420b supplies each of the one or more user inputs to the user interface 401b, the remote input receptor 400b may send a signal 430b representing each of the user inputs to a network 410b. The network 410b may perform an operation upon receipt of a correct succession of signals or deny an operation upon receipt of an incorrect succession of signals.

Figure 5:
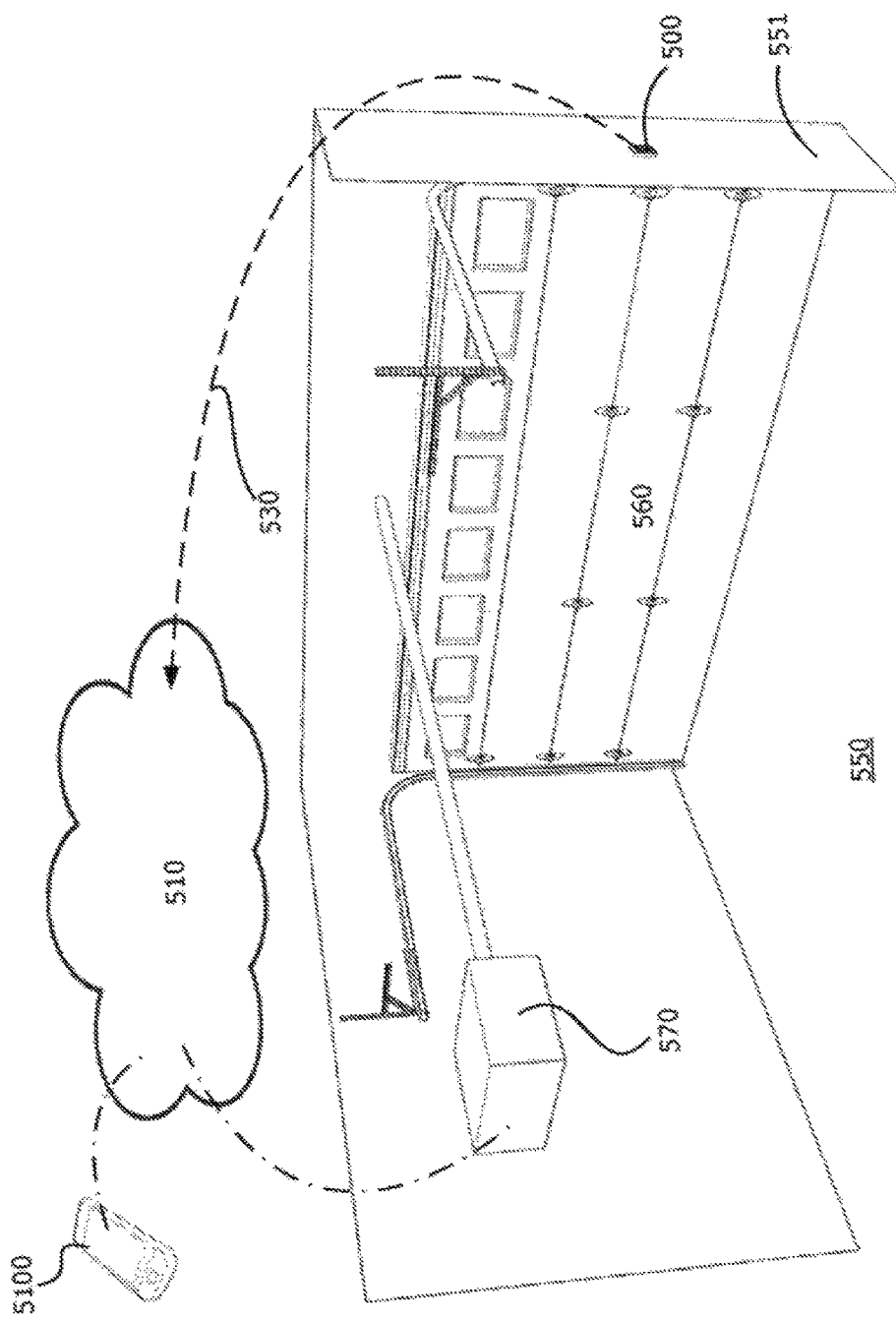
FIG. 5 is a perspective view of elements of an embodiment of a secure remote actuation system associated with an enclosed area.

FIG. 5 shows an embodiment of an enclosed area 550 comprising an access barrier 560, such as a door, for blocking or allowing access to the enclosed area 550. The access barrier 560 may comprise an actionable device 570, such as a garage door motor or a door lock, for permitting or denying access to the enclosed area 550. A network 510 may be operably connected to the actionable device 570, wherein the network 510 is capable of actuating the actionable device 570.

A remote input receptor 500 capable of receiving one or more user inputs may be disposed in, near, or on an exterior 551 of the enclosed area 550. The remote input receptor 500 may be connected to the network 510 via a wireless connection 530. As a user begins supplying a user input to the remote input receptor 500, the network 510 may obtain the user input from the remote input receptor 500. For example, if a user supplies one or more user inputs to the remote input receptor 500, the remote input receptor 500 may send the user inputs to the network 510. If the user inputs are found to be acceptable at the network 510, such as being one of a list of acceptable inputs, the network 510 may perform an operation, such as opening or closing the access barrier 560, or engaging or disengaging a door lock.

In various embodiments, an actionable device may comprise an access control device, such as an electromechanical door lock, a garage door motor, or another access restricting mechanism. Actuation of the access control device may comprise an opening of a door or an engagement or disengagement of a lock. In these embodiments, a user may gain access to a secure area by supplying inputs to a remote input receptor that match one or more acceptable inputs. In other embodiments, an actionable device may comprise a thermostat, a television, an automated window, automated blinds, a ventilation system, a sprinkler system, a lighting element, an indoor positioning system, or other such devices known in the art.

The network 510 may comprise one or more electronic devices 5100. In the embodiment shown, the one or more electronic devices 5100 comprises a smartphone. However, other embodiments of an electronic device may comprise a laptop or desktop computer, a tablet, or other devices capable of communicating over such a network. The electronic device 5100 may comprise a software application for management of the network 510 including creating, deleting, or editing one or more acceptable inputs.

Additionally, the software application may be used to create, delete, or edit one or more input parameters. Such input parameters may be used to determine one or more conditions upon which an actuated system may operate. For example, the one or more input parameters may comprise a predetermined user interface interaction sequence, such as a combination of keystrokes supplied by a user, a combination of user inputs, a predetermined sequence of user inputs, a time window during which the network 510 may receive one or more user inputs, a limitation on which one or more user inputs may be supplied to gain access to the secure area 550, or a limitation on how many times one or more user inputs may be received by the network 510.

In various embodiments, the actionable device may comprise a UAV. For example, in some embodiments, a secure remote operation and actuation system includes one or more UAVs, a remote input receptor, a cloud-based network storing one or more acceptable inputs, the cloud-based network including one or more network devices that obtain user inputs from the remote input receptor. The network device obtains the one or more user inputs from the remote input receptor while the user is using the user interface of the remote input receptor. The cloud-based network compares the one or more user inputs to the one or more acceptable inputs. As the one or more user inputs are found acceptable, the cloud-based network performs an operation corresponding to the one or more UAVs.

In various embodiments, the one or more acceptable inputs include one or more authorization codes authorizing the operation corresponding to the one or more UAVs. The one or more user inputs may include a user code corresponding to one or more of the authorization codes, thereby notifying the cloud-based network the user has permission to send operation commands to the one or more UAVs. When a user is identified as an authorized user, the user may input one or more instructions for the operation of the one or more UAVs. In some embodiments, the instructions include delivery instructions for a payload, such as a payload pick-up location and/or a payload drop-off location. The instructions may also include one or more of a payload weight, a payload shape, or one or more payload length dimensions. The instructions may also include real-time directional steering of the one or more UAVs from the remote input receptor via that cloud-based network. In such embodiments, the remote input receptor may include a remote control device for the one or more UAVs. The instructions may also include real-time monitoring of a secured enclosure, such as via a video feed relays from the one or more UAVs, through the cloud-based network, and to the remote input receptor.

The instructions may also include instructions for an unmanned aerial vehicle relay that enables long-range delivery of payloads over distances further than the range of any individual UAV or collection of co-operating UAVs. The instructions may include instructions for in-flight exchanging of one or more current unmanned aerial vehicles with one or more new unmanned aerial vehicles. An example of such a process may include coupling one or more support unmanned aerial vehicles to the one or more current unmanned aerial vehicles in-flight; removing one or more depleted energy storage cartridges corresponding to the one or more current unmanned aerial vehicles in-flight; and replacing one or more charged energy storage cartridges on the one or more unmanned aerial vehicles in-flight. Another example may include recharging one or more depleted energy storage cartridges corresponding to the one or more unmanned aerial vehicles in-flight.

In some instances, the payload drop-off location may include an enclosure having an access barrier. In such cases, the delivery instructions may include instructions for delivering the payload past the access barrier and into the enclosure. For example, the access barrier may comprise a wireless actuation mechanism, and the delivery instructions may comprise a radio frequency transmission profile corresponding to the wireless actuation mechanism. In some embodiments, the transmission profile is a dual modulation profile, incorporating frequency shift keying and spread spectrum frequency hopping. In other embodiments, the transmission profile includes one or more of ZigBee, Z-Wave, Bluetooth, Wi-Fi, or sub-1 GHz frequency communication. Additionally, or alternatively, the access barrier may comprise a wireless locking mechanism, and the delivery instructions may comprise a radio frequency transmission profile corresponding to the wireless locking mechanism. The transmission profile may be similar to the actuation mechanism transmission profile. The one or more UAVs may include one or more wireless transmitters, and may transmit the radio frequency transmission profile, thereby gaining access to the enclosure to deliver the payload.

In various embodiments, the system may include two or more UAVs, and in some such embodiments the two or more UAVs may be joined to form a collective UAV, which is described below in more detail.

Below is described a single UAV and a collective UAV configuration in which multiple UAVs may be coupled together to form a collective UAV, any of which may be used with the secure remote operation and actuation system described above in performing various operations. A collective UAV, as used herein, is two or more coupled UAVs. A collective UAV may be used to aerially transport virtually any size, weight, or quantity of items, travel longer distances, etc. For example, rather than using one large UAV to carry a larger or heavier item, multiple smaller UAVs may couple together to form a collective UAV that is used to carry the larger or heavier item.

In many instances, a single UAV configuration may be capable of delivering a large percentage of the ordered items. However, some items may require a larger UAV that is capable of lifting and aerially transporting a larger or heavier item. Likewise, some orders for items may specify delivery destinations that require a UAV with longer flight duration. Rather than having to maintain multiple UAV configurations or utilize a UAV configuration that is not necessary for the majority of the item deliveries, the implementations described herein utilize multiple UAVs to form a collective UAV that is capable of transporting larger and/or heavier items or aerially navigating longer distances.

In addition to forming a collective UAV to carry larger and/or heavier items or to aerially navigate longer distances, as described herein, UAVs that are capable of carrying an item independent of other UAVs may couple to form a collective UAV to aerially navigate as a collective UAV to a delivery area. When one or all of the UAVs reach the delivery area, the UAVs may decouple to deliver items to different delivery destinations. By aerially navigating as a collective UAV, the coupled UAVs can share resources (e.g., computing resources, power, navigation, etc.), be more efficient, be more visible, generate larger radar or object detection, be more detectable by ground based radar or air traffic control, etc. For example, a collective UAV that includes multiple coupled UAVs (e.g., twenty) will be more visible to other aircraft as well as air traffic control, thereby improving safety for the UAVs and other aircraft. Likewise, when multiple UAVs are coupled to form a collective UAV, some of the UAVs may reduce the rotational speed of one or more of their motors, relying on the lifting force of the collective UAV, thereby reducing the overall energy consumed during aerial navigation.

Figure 6:
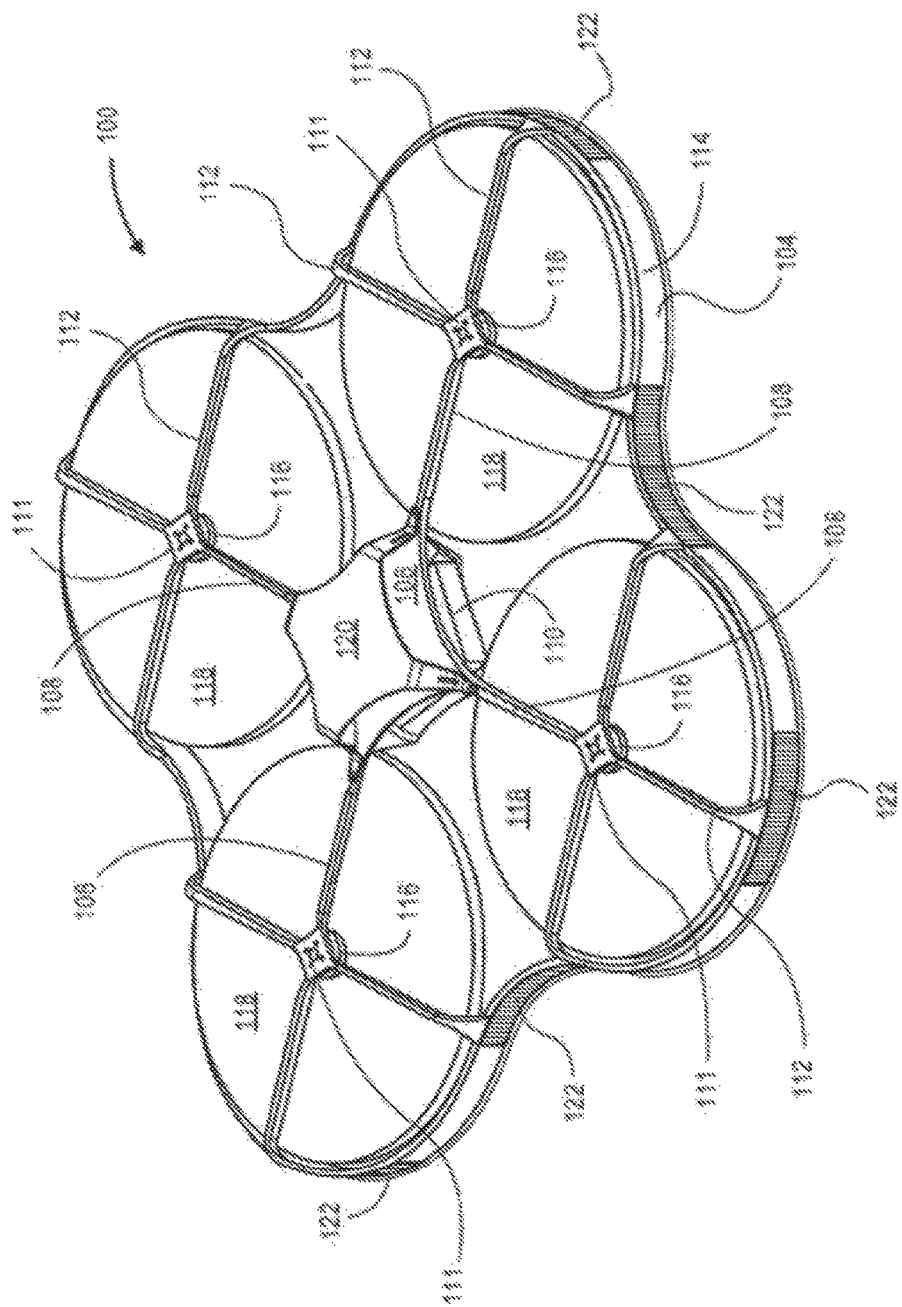
FIG. 6 depicts a view of a UAV configuration, according to an implementation.

FIG. 6 illustrates a view of a UAV 100, according to an implementation. As illustrated, the UAV 100 includes a frame 104. The frame 104 or body of the UAV 100 may be formed of any suitable material, such as graphite, carbon fiber, aluminum, titanium, etc., or any combination thereof. In this example, the frame 104 of the UAV 100 is a single carbon fiber frame. The frame 104 includes a hub 106, motor arms 108, motor mounts 111, support arms 112, and a perimeter protective barrier 114. In this example, there is a single hub 106, four motor arms 108, four motor mounts 111, twelve support arms 112, and a single perimeter protective barrier 114. In other implementations, a UAV may include additional or fewer hubs, motor arms, motor mounts, support arms, or protective barriers.

Each of the motor arms 108 extend from the hub 106 and couple with or terminate into the motor mounts 111. Lifting motors 116 are coupled to an inner side of the motor mount 111 so that the lifting motor 116 and corresponding lifting propeller 118 are within the frame 104. In one implementation, the lifting motors 116 are mounted so that the propeller shaft of the lifting motor that mounts to the lifting propeller 118 is facing downward with respect to the frame 104. In other implementations, the lifting motors may be mounted at other angles with respect to the frame 104 of the UAV 100. The lifting motors may be any form of motor capable of generating enough rotational speed with the propellers to lift the UAV 100 and an engaged payload, thereby enabling aerial transport of the payload.

Mounted to each lifting motor 116 is a lifting propeller 118. The lifting propellers 118 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery destination. For example, the lifting propellers 118 may each be carbon fiber propellers having a dimension or diameter of twenty-nine inches. While the illustration of FIG. 6 shows the lifting propellers 118 all of a same size, in some implementations, one or more of the lifting propellers 118 may be different sizes and/or dimensions. Likewise, while this example includes four lifting propellers, in other implementations, more or fewer propellers may be utilized as lifting propellers 118. Likewise, in some implementations, the lifting propellers 118 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

Extending from each motor mount 111 are three support arms 112 that couple with or otherwise terminate into the perimeter protective barrier 114. The perimeter protective barrier 114 extends around the perimeter of the UAV and encompasses the lifting propellers 118. In some implementations, the perimeter protective barrier 114 may include a vertical component that extends substantially downward from the support arms and approximately perpendicular to the axis of rotation of the lifting propellers 118. The vertical component may be of any vertical dimension and width. For example, the vertical component may have a vertical dimension of approximately three inches and a width of approximately 0.5 inches. In other implementations, the vertical dimension and/or the width may be larger or smaller. Likewise, the vertical component of the perimeter protective barrier may include a core, such as a foam, wood and/or plastic core. The vertical component may be coupled to each of the support arms and extend around the outer perimeter of each propeller 118 to inhibit access to the propellers from the sides of the UAV 100.

The perimeter protective barrier 114 provides safety for objects foreign to the UAV 100 by inhibiting access to the propellers 118 from the side of the UAV 100, provides protection to the UAV 100 and increases the structural integrity of the UAV 100. For example, if the UAV 100 is traveling horizontally and collides with a foreign object (e.g., wall, building), the impact between the UAV and the foreign object will be with the perimeter protective barrier 114, rather than a propeller. Likewise, because the frame is interconnected, the forces from the impact are dissipated across the frame 104.

Likewise, the perimeter protective barrier 114 provides a surface upon which one or more components of the UAV may be mounted. For example, one or more antennas may be mounted to the perimeter protective barrier 114. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, distance determining elements, gimbals, Global Positioning System ("GPS") receiver/transmitter, radars, illumination elements, speakers, and/or any other component of the UAV 100 or the UAV control system (discussed below), etc., may likewise be mounted to the perimeter protective barrier 114. Likewise, identification or reflective identifiers may be mounted to the vertical component to aid in the identification of the UAV 100.

The perimeter protective barrier 114 may also include one or more coupling components 122. The coupling components may be configured to enable coupling between the UAV 100 and another UAV to form a collective UAV. In this example, there are multiple coupling components 122 distributed at different locations along the perimeter protective barrier 114, thereby enabling coupling of the UAV 100 at different locations and/or coupling of the UAV 100 with multiple other UAVs. In some implementations, the entire protective barrier 114 may include coupling components, thereby enabling coupling of UAVs at any position and/or orientation with the UAV 100. The coupling component may provide any form of coupling sufficient to engage two or more UAVs together. For example, the coupling component may include a mechanical coupling, an electrical coupling, an electromechanical coupling, a magnetic coupling, an electromagnetic coupling, etc. In one implementation, the protective barrier 114 may include a series of electromagnets that may be activated by the UAV control system 110 to couple the UAV 100 with another UAV or deactivated to decouple the UAV 100 from another UAV. In other implementations, the coupling may be a static or stationary coupling such as a series of latches or grooves that mate together to couple two or more UAVs.

Figure 10:
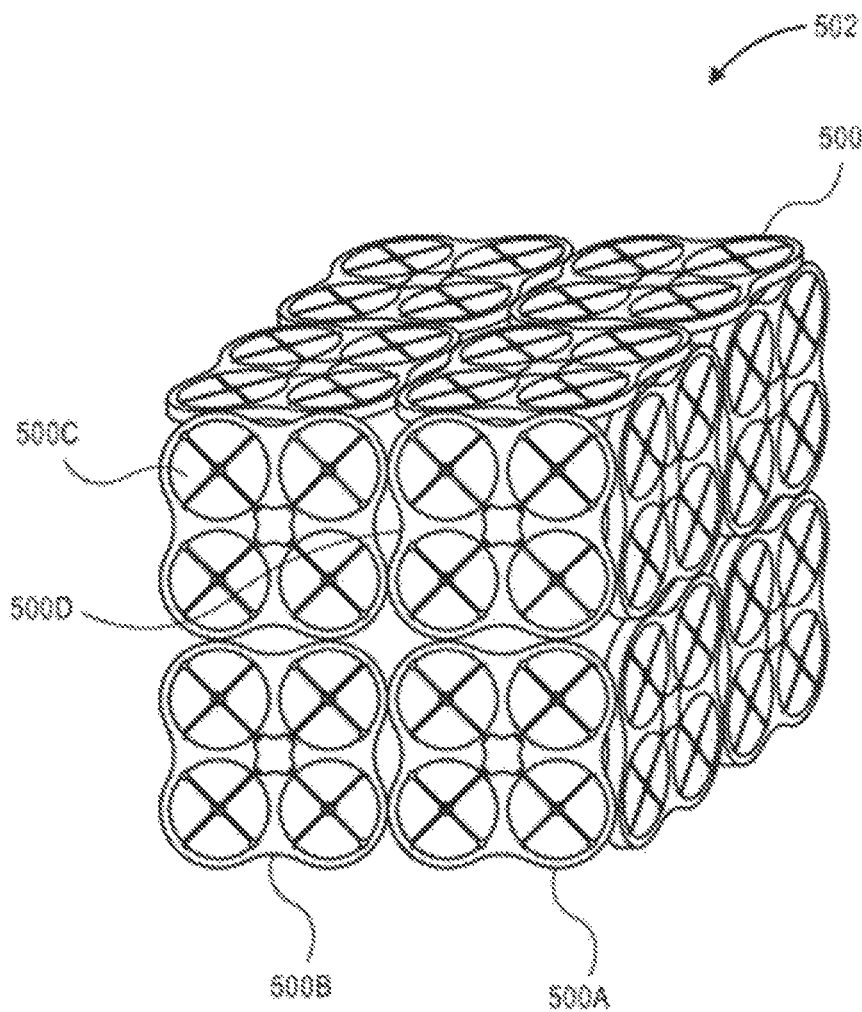
FIG. 10 depicts a view of another collective UAV configuration, according to an implementation.

The coupling components 122 may be on the side, top, or bottom of the perimeter protective barrier 114 to enable coupling of other UAVs at different angles or orientations. For example, the UAV 100 may include a coupling component on a top of the mounting plate 120 so that the UAV 100 may be coupled with a second UAV in a vertical configuration. An example collective UAV configuration with UAVs coupled in different orientations is illustrated in FIG. 10.

In some implementations, the coupling components 122 could be hinged or otherwise configured to allow pivoting or rotation between coupled UAVs. For example, as discussed below with respect to FIG. 9, the coupling components may allow one or more degrees of freedom in rotation between coupled UAVs to allow the collective UAV configuration to flex or adjust as it navigates.

In addition to providing a physical coupling between two or more UAVs, the coupling component 122 may provide electrical and/or data communication between coupled UAVs. For example, UAVs may exchange navigation information and/or share computing resources via a data transmission between the coupling components 122 of the coupled UAVs. Likewise, power resources may be shared via the coupling components 122 of the UAVs. For example, the UAV 100 may have excess power supply stored in the power modules. While the UAV 100 is coupled with another UAV, it may provide the excess power supply to the coupled UAV via the connection component 122.

While the example illustrated in FIG. 6 shows a perimeter protective barrier 114 with a vertical component and a series of coupling components 122, in other implementations, the perimeter protective barrier may have other configurations. For example, the perimeter protective barrier may be angled (e.g., forty-five degree angle) with respect to the UAV 100, and extend from above the lifting propellers where it is coupled with the support arms 112 to below the lifting propellers 118. The angles on different sides of the UAV 100 may extend in opposite directions. Other UAVs may couple with the UAV 100 by aligning an opposing angled side with a side of the UAV 100 and coupling the coupling components between the two UAVs. Such a configuration may improve the aerodynamics of the UAV 100 and/or a collective UAV configuration. In other implementations, the perimeter protective barrier may have other configurations or designs.

In addition to providing protection for the UAV 100 and coupling components to enable coupling of multiple UAVs, the frame 104 provides structural support for the UAV 100. By interconnecting the hub 106, motor arms 108, motor mounts 111, support arms 112, and perimeter protective barrier 114, the resulting frame has structural stability and is sufficient to support the lifting motors, lifting propellers, a payload (e.g., items), UAV control system, and/or other components of the UAV.

In some implementations, the frame 104 may also include a permeable material (e.g., mesh, screen) that extends over the top and/or lower surface of the frame to inhibit vertical access to the propellers from above or below the propellers 118. Likewise, in some implementations, one or more mounting plates 120 may be affixed to the frame 104 to provide additional surface area for mounting components to the UAV 100. The mounting plates 120 may be removably coupled to the frame 104, for example, using screws, fasteners, etc. Alternatively, the mounting plates 120 may be formed as part of the frame 104.

A UAV control system 110 is also mounted to the frame 104. In this example, the UAV control system 110 is mounted between the hub 106 and a mounting plate 120. The UAV control system 110, as discussed in further detail below with respect to FIG. 19, controls the operation, routing, navigation, communication, motor controls, resource sharing, coupling components 122, and the payload engagement mechanism of the UAV 100.

Likewise, the UAV 100 includes one or more power modules (not shown). The power modules may be mounted to various locations on the frame. For example, in some implementations, four power modules may be mounted to each mounting plate 120 and/or to the hub 106 of the frame. The power modules for the UAV 100 may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 110, the lifting motors 116, the payload engagement mechanism, the coupling components 122, etc.

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module. As another example, when the UAV is coupled to and part of a collective UAV, it may receive excess power from another coupled UAV and utilize that excess power to provide power to the UAV 100 components and/or to re-charge the power module(s) of the UAV 100.

As mentioned above, the UAV 100 may also include a payload engagement mechanism (not shown). The payload engagement mechanism may be configured to engage and disengage items and/or containers that hold items. In this example, the payload engagement mechanism is positioned beneath and coupled to the hub 106 of the frame 104 of the UAV 100. The payload engagement mechanism may be of any size sufficient to securely engage and disengage containers that contain items. In other implementations, the payload engagement mechanism may operate as the container, in which it contains item(s). The payload engagement mechanism communicates with (via wired or wireless communication) and is controlled by the UAV control system 110. In some implementations, the payload engagement mechanism may be configured to operate in conjunction with payload engagement mechanisms of other UAVs that are coupled to form a collective UAV to engage/disengage larger items.

While the implementations of the UAV 100 discussed herein utilize propellers to achieve and maintain flight, in other implementations, the UAV may be configured in other manners. For example, the UAV may include fixed wings and/or a combination of both propellers and fixed wings.

Figure 7:
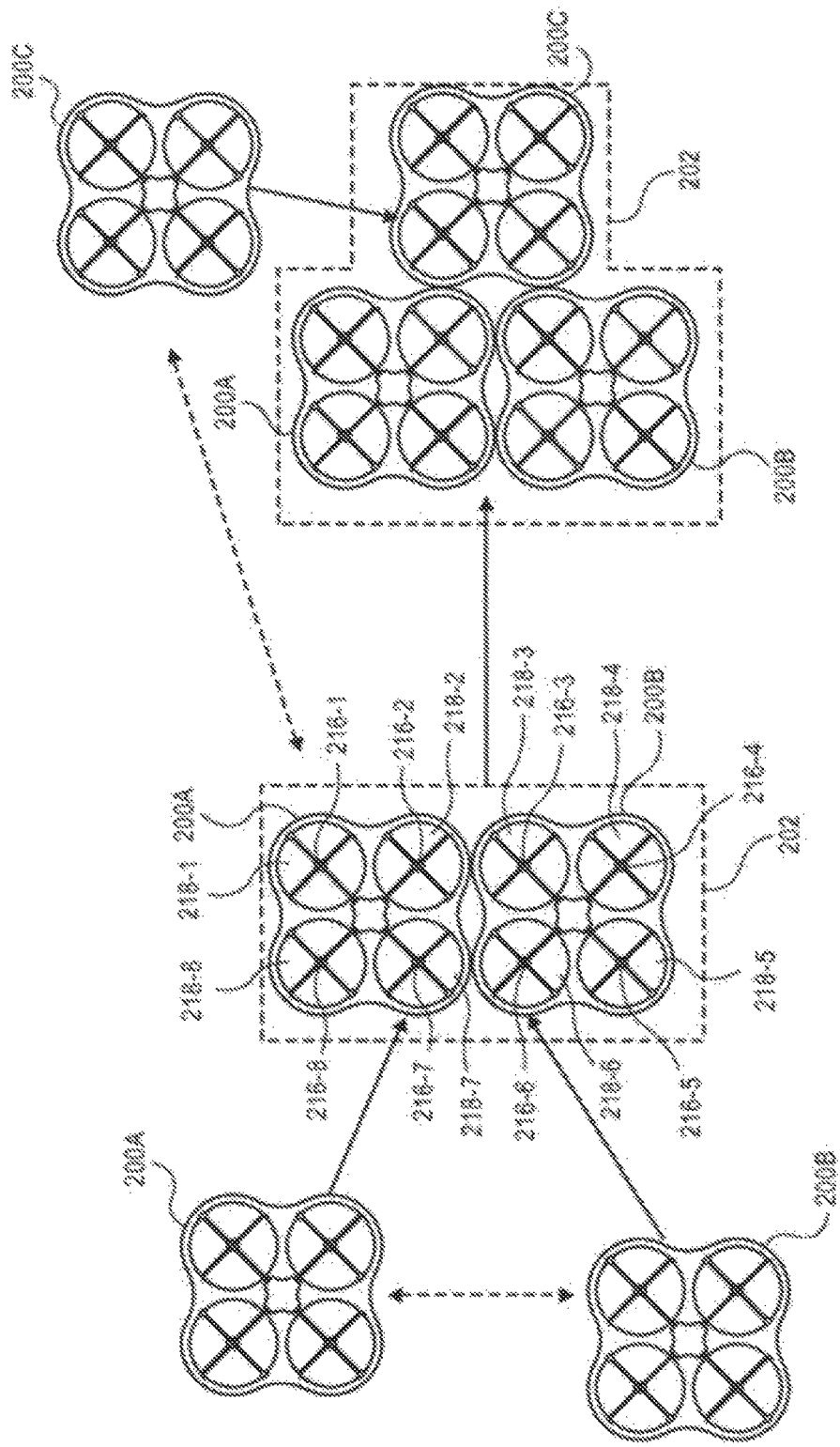
FIG. 7 depicts a top-down view of a plurality of UAVs forming a collective UAV, according to an implementation.

FIG. 7 depicts a top-down view of a plurality of UAVs 200 forming a collective UAV 202, according to an implementation. As illustrated in this example, two UAVs 200A, 200B wirelessly communicate to determine if they should couple to form a collective UAV 202. For example, each UAV 200 may exchange flight plan information, configuration information, etc., to determine if forming a collective UAV is beneficial. In one implementation, if the flight plans of each UAV are complementary, it may be determined that the UAVs should couple to form a collective UAV 200. Flight plans may be determined to be complementary if the UAVs 200 are navigating in a similar direction, toward a similar destination (e.g., materials handling facility, delivery area, etc.), coupling would result in a net power savings, coupling would result in increased safety, coupling would result in faster aerial transport, etc. For example, if UAV 200A and UAV 200B are both navigating to the same materials handling facility, it may be determined that their flight plans are complementary. As another example, if UAV 200A is navigating to a first delivery area and UAV 200B is navigating to a second delivery area, it may be determined that the flight plans of the two UAVs 200A, 200B are complementary if UAV 200B will pass the first delivery area within a defined distance as it navigates to the second delivery area.

Other factors may also be considered in determining if UAVs should couple. For example, the remaining power of each UAV may be considered, weather and/or other external factors may also be considered. For example, if the UAVs are in an area with other aircraft, it may be determined that the UAVs should couple to form a collective UAV to increase visibility of the UAVs to other aircraft.

If it is determined that the two UAVs 200A, 200B are to couple, the UAVs will determine a collective UAV configuration and then couple according to that collective UAV configuration to form a collective UAV 200. The collective UAV configuration may be determined by one or more of the UAVs 200A, 200B, and/or may be determined by a collective UAV configuration system 1528 (FIG. 70) operating on a remote computing resource and provided wirelessly to one or more of the UAVs 200A, 200B.

Once coupled, the UAVs 200A, 200B may determine or receive from the collective UAV configuration system 1528 combined operating information and a collective flight plan. For example, if the two UAVs 200A, 200B are navigating to the same materials handling facility, one or more of the UAVs may determine a collective UAV flight plan that is to be followed by each UAV to navigate the collective UAV to the materials handling facility.

The UAVs may operate in a distributed manner, each UAV navigating a component or offset of the flight plan and controlling the motors of the UAV. In other implementations, one or more of the UAVs may control the collective UAV configuration. For example, UAV 200A may be designated as the master UAV of the collective UAV 202 and provide speed control instructions to the motors of the UAV 200A and the motors of the UAV 200B, to control the operation and navigation of the collective UAV 202. In such an implementation, data may be exchanged between the UAVs through the coupling components that couple the UAVs and/or transmitted wirelessly. Likewise, one or more components of the slave UAV 200B, such as the control system, may transition to a lower power state, thereby conserving power.

In some implementations, one or more of the UAVs 200A, 200B may also determine if the rotational speed of one or more of the motors of the UAV may be reduced or terminated. For example, because UAV 200A has coupled with UAV 200B, the collective UAV 202 has eight motors and propellers. In some implementations, the rotational speed of the interior motors 216-2, 216-3, 216-6, 216-7 and corresponding interior propellers 218-2, 218-3, 218-6, 218-7 of the collective UAV 202 may be reduced or terminated and the exterior motors 216-1, 216-4, 216-5, 216-8 and corresponding exterior propellers 218-1, 218-4, 218-5, 218-8 may be utilized to aerially navigate the collective UAV 202.

Any number or combination of UAVs may couple to form any size and configuration of a collective UAV 202. As illustrated in FIG. 7, a third UAV 200C wirelessly communicates with the collective UAV 202 and then couples with and becomes part of the collective UAV 202. As with the initial coupling of UAVs 200A, 200B, the UAVs 200 may directly communicate, exchanging UAV configurations, collective UAV configuration, flight plan information, etc. Alternatively, the collective UAV configuration system 1528 may wirelessly send instructions to the collective UAV 202 and/or the UAV 200C instructing the coupling of the UAV 200C to the collective UAV 202.

A UAV 200C may couple with one or more UAVs that form a collective UAV 202. As illustrated in FIG. 7, the UAV 200C has coupled with both UAV 200A and UAV 200B according to a determined collective UAV configuration. The collective UAV configuration may take any form and may vary depending on, for example, the number of UAVs forming the collective UAV, the weather, the number and/or weight of items carried by UAVs of the collective UAV, power requirements, whether one or more of the UAVs of the collective UAV is damaged or inoperable, etc.

Figure 8:
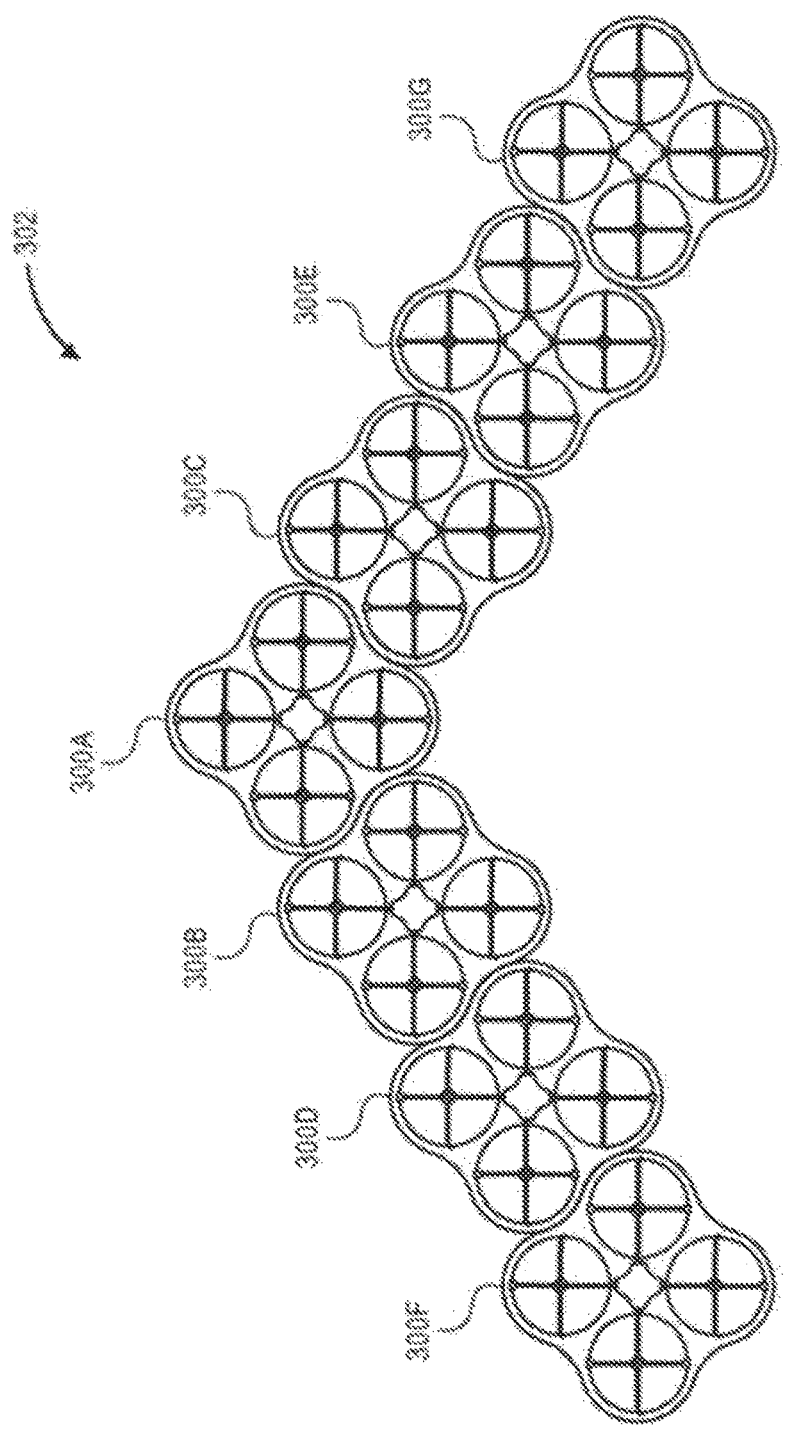
FIG. 8 depicts a top-down view of a collective UAV configuration, according to an implementation.

For example, FIG. 8 depicts a top-down view of a collective UAV 302 having a "V" configuration, according to an implementation. The collective UAV 302, in this example, includes seven UAVs 300A, 300B, 300C, 300D, 300E, 300F, 300G that are coupled to form the collective UAV 302. Each UAV 300 is coupled to one other UAV of the collective UAV. The V configuration of the collective UAV may be utilized to provide better aerodynamics, benefit from lift from leading UAVs of the collective UAV, and/or reduce the overall power consumed by the collective UAV.

Figure 9:
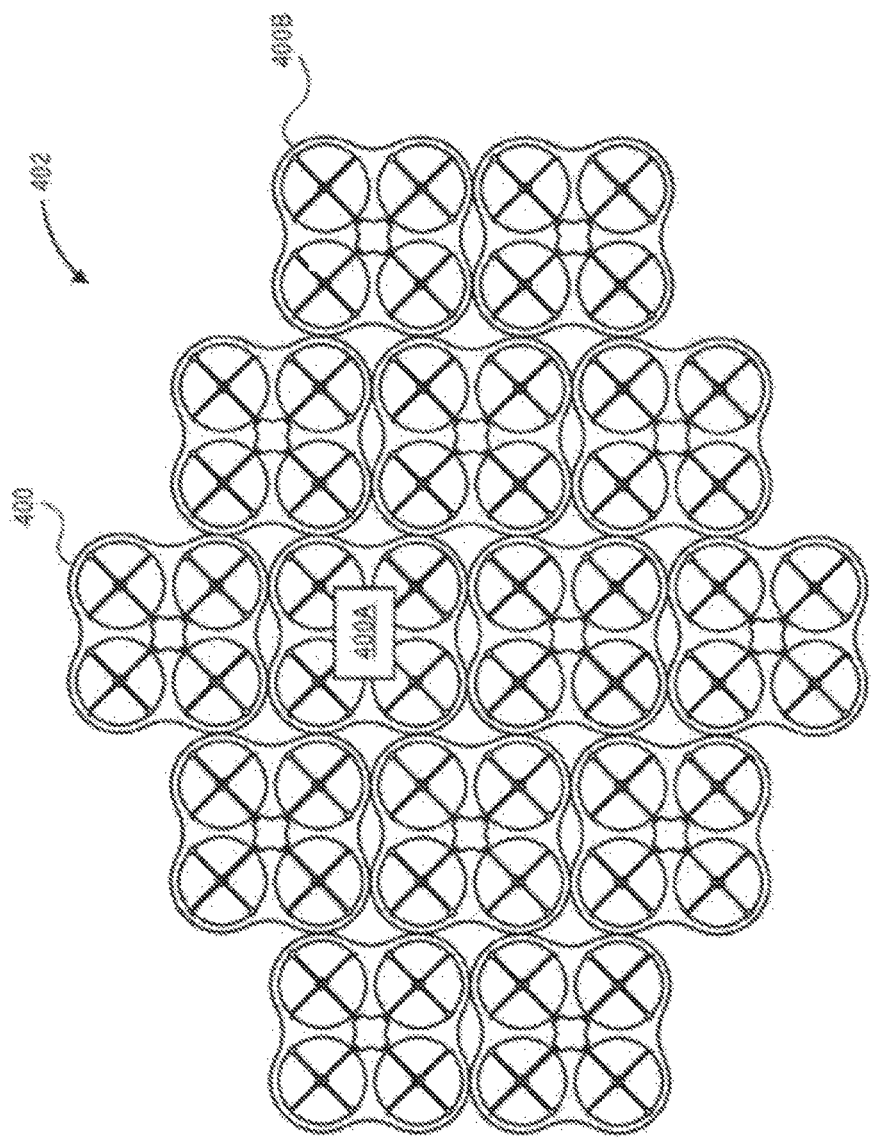
FIG. 9 depicts a top-down view of another collective UAV configuration, according to an implementation.

FIG. 9 depicts another top-down view of a collective UAV 402 having a different configuration, according to an implementation. In this example, there are fourteen UAVs 400 coupled to one another to form the collective UAV 402. In this example, each UAV is coupled to at least one other UAV to form the collective UAV 402. Some of the UAVs are coupled to up to six different UAVs. In some implementations, the coupling components that couple one or more of the UAVs 400 of the collective UAV 402 may allow one or more degrees of freedom of rotation at the coupling. For example, as the collective UAV 400 adjusts its heading, yaw, pitch and/or roll, the leading perimeter UAVs 400 may begin the adjustment and the coupling between those leading perimeter UAVs 400 may allow flex between the leading perimeter UAVs and the UAVs 400 to which they are coupled. As the collective UAV 402 adjusts its heading, yaw, pitch, and/or roll, the other coupled UAVs 400 will likewise adjust until the adjustment of the collective UAV 402 has completed.

FIG. 10 is another illustration of a collective UAV 502, according to an implementation. In comparison to the collective UAVs discussed above with respect to FIGS. 2-4, the collective UAV 502 illustrates UAVs coupled at different orientations. In this example, the collective UAV 502 is in the form of a cube that includes a total of twenty-four UAVs 500 coupled to form the cube; each side of the cube including four UAVs 500. While FIG. 10 illustrates the collective UAV 502 in the form of a cube, the collective UAV may be arranged to have any shape. For example, rather than a cube, the UAVs may couple to form a sphere shaped collective UAV 502.

In a cube shape, such as that illustrated in FIG. 10, the collective UAV 502 includes larger surface area on each side of the collective UAV 502 making it more detectable by other aircraft and/or flight control systems. Likewise, the propellers of the UAVs on different sides of the collective UAV 502 may be utilized to adjust the heading, pitch, yaw, and/or roll of the UAV. Still further, one or more of the propellers on a side of the collective UAV 502 may be utilized to provide horizontal thrust to propel the collective UAV in a direction that includes a horizontal component. For example, the propellers of the UAVs 500A, 500B, 500C, and 500D that are coupled to form a side of the collective UAV 502 may be utilized to provide horizontal thrust for the collective UAV 502. Likewise, the propellers on the top and/or bottom of the collective UAV 502 may provide lifting force to lift the collective UAV 502.

As discussed above with respect to FIG. 7, the UAVs of a collective UAV, such as those illustrated in FIGS. 2-5, may share resources, reduce rotational speed of one or more motors, and/or otherwise function as a collective to reduce the overall power consumed by the collective UAV and/or to extend the distance or time the collective UAV may aerially navigate. For example, referring again to FIG. 9, the interior UAVs, such as UAV 400A, is coupled to six other UAVs and may be able to reduce and/or terminate the rotation of the motors of the UAV 400A and be supported by the other UAVs 400 of the collective UAV 402, thereby conserving power. In comparison, UAV 400B, which is on the perimeter of the collective UAV 402, may maintain rotational speed of some or all of its motors to provide sufficient lift to aerially navigate the collective UAV 402. In this example, UAV 400B may operate in conjunction with each of the other UAVs 400 coupled along the perimeter of the collective UAV 402.

As additional UAVs couple with a collective UAV and/or as UAVs decouple from a collective UAV, the UAV configuration changes and one or more of the other UAVs of the collective may decrease or increase the rotational speed of one or more of its motors and/or share resources with the collective UAV. Likewise, as discussed above, a collective UAV may operate in a distributed manner, with each UAV maintaining and operating the motors and/or other components of the UAV. Alternatively, the collective UAV may operate in a master-slave configuration in which one of the UAVs of the collective UAV operates as a master, providing navigation instructions, motor speed control instructions, etc., to the other UAVs of the collective UAV. Any control scheme may be utilized to maintain the operation and control of the collective UAV and the distributed configuration and master-slave configuration are provided only as examples. For example, the collective UAV configuration system 1528 may provide navigation instructions to each of the UAVs of the collective UAV.

Figure 11:
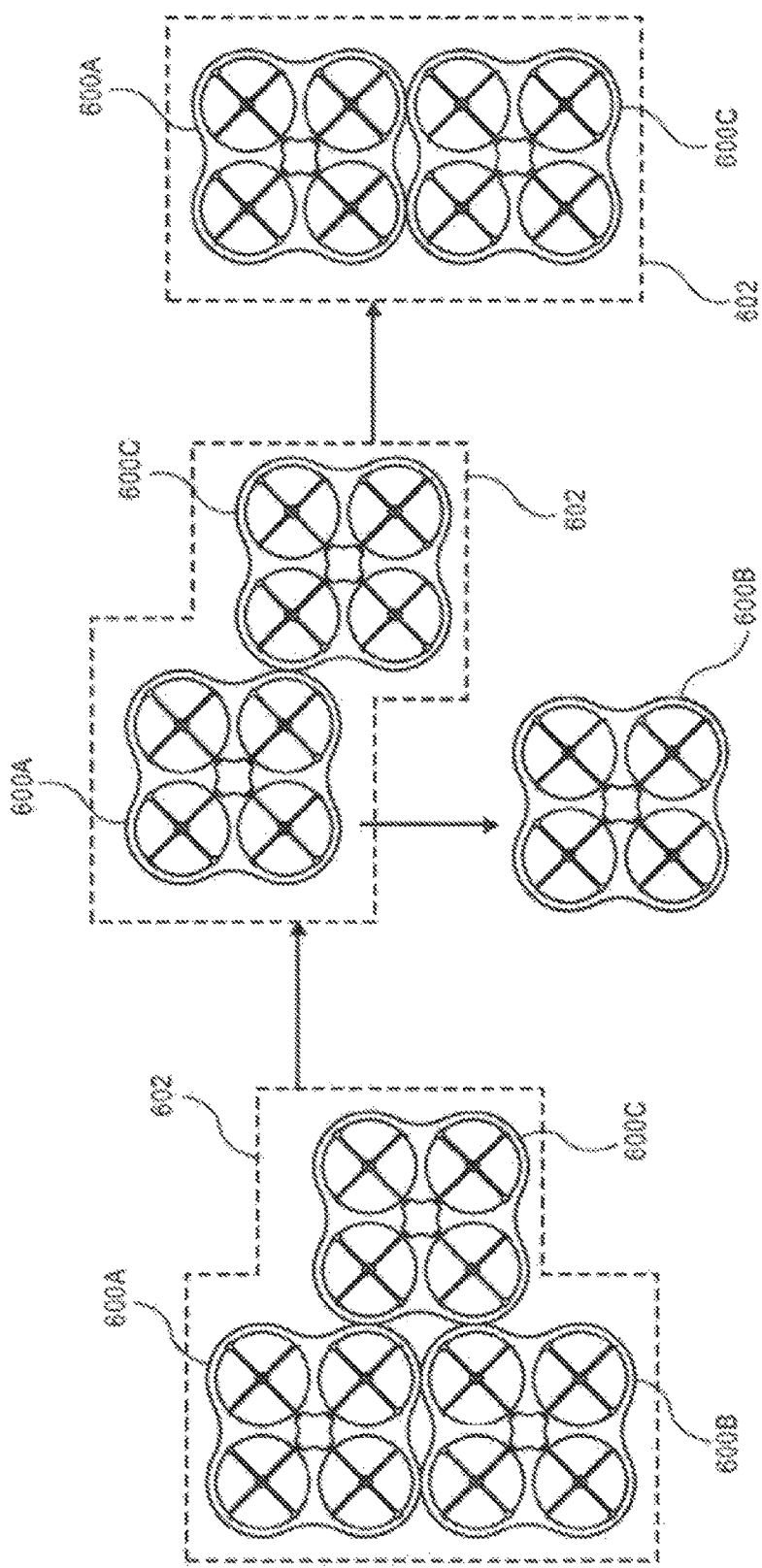
FIG. 11 depicts a top-down view of a collective UAV configuration with a UAV decoupling from the collective UAV, according to an implementation.

FIG. 11 depicts a top-down view of a collective UAV 602 with a UAV 600B decoupling from the collective UAV, according to an implementation. In this example, the collective UAV 602 includes three coupled UAVs 600A, 600B, 600C that are aerially navigating along a flight path. At some point during aerial navigation, UAV 600B decouples from the collective UAV 602. For example, UAV 600B may have reached a point in the flight path where it is to decouple from the collective UAV and navigate to another location (e.g., delivery destination).

Upon decoupling from the collective UAV 602, the UAV 600B may resume aerial navigation utilizing its own UAV control system to aerially navigate to a destination. Likewise, when a UAV decouples from a collective UAV 602, the collective UAV 602 determines the updated collective UAV configuration and/or whether the remaining UAVs 600A, 600C of the collective UAV 602 should reconfigure into a different configuration. For example, upon decoupling of UAV 600B, the remaining UAVs 600A, 600C are coupled with one coupling component and offset from one-another. Because this may not be a preferred UAV configuration, it may be determined that the UAVs 600A, 600C should decouple and then recouple to form a different UAV configuration, as illustrated. In other implementations, the UAVs may remain in the existing configuration.

While the example illustrated in FIG. 11 shows a perimeter UAV 600B of the collective UAV 602 decoupling, in other implementations, any UAV of a collective UAV may decouple. For example, referring back to FIG. 9, the UAV 400A may decouple from the collective UAV 402. In such an example, the collective UAV 402 may reconfigure, another UAV that is either already coupled with the collective UAV or requesting to couple with the UAV may be instructed to assume the position of the now decoupled UAV 400A, or an empty space may be left in the collective UAV 402.

Figure 12:
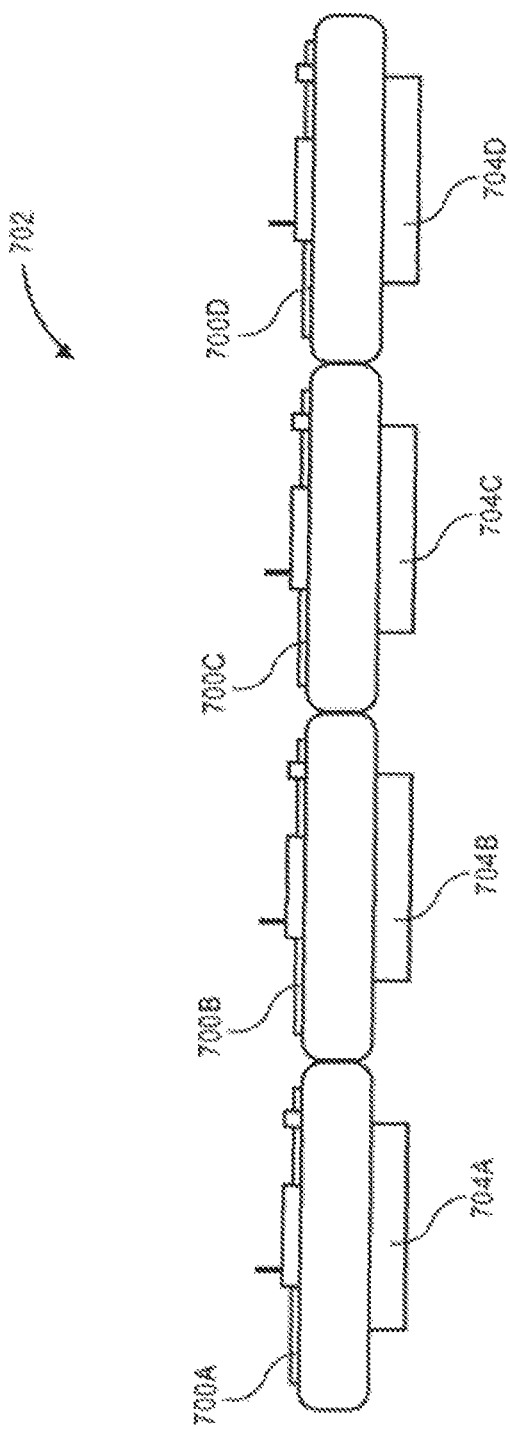
FIG. 12 depicts a side-view of a collective UAV configuration, according to an implementation.

As discussed above, one or more UAVs of a collective UAV may carry a payload (e.g., item or item package) or multiple UAVs of the collective UAV may operate together to carry a single payload. For example, FIG. 12 depicts a side-view of a collective UAV configuration 702, according to an implementation. In this example, each UAV 700A, 700B, 700C, 700D is carrying a respective payload 704A, 704B, 704C, 704D. As discussed further below, the UAVs 700 of the collective UAV 702 may all be navigating to a delivery area in which they will deliver the respective payload 704 to a delivery destination within that delivery area. The UAVs 700 may couple to form the collective UAV 702 as they aerially navigate from a location (e.g., materials handling facility) until they reach the delivery area. As the collective UAV reaches the delivery area, one or more of the UAVs 700 may decouple and complete delivery of the payload to the delivery destination.

Likewise, as UAVs complete delivery of a payload, they may couple with other UAVs to form a collective UAV to aerially navigate from the delivery area. For example, as the UAVs 700 complete delivery of the payloads 704 to respective delivery destinations, the UAVs may couple back together to form the collective UAV 702 and aerially navigate to another location (e.g., return to the materials handling facility).

Figure 13:
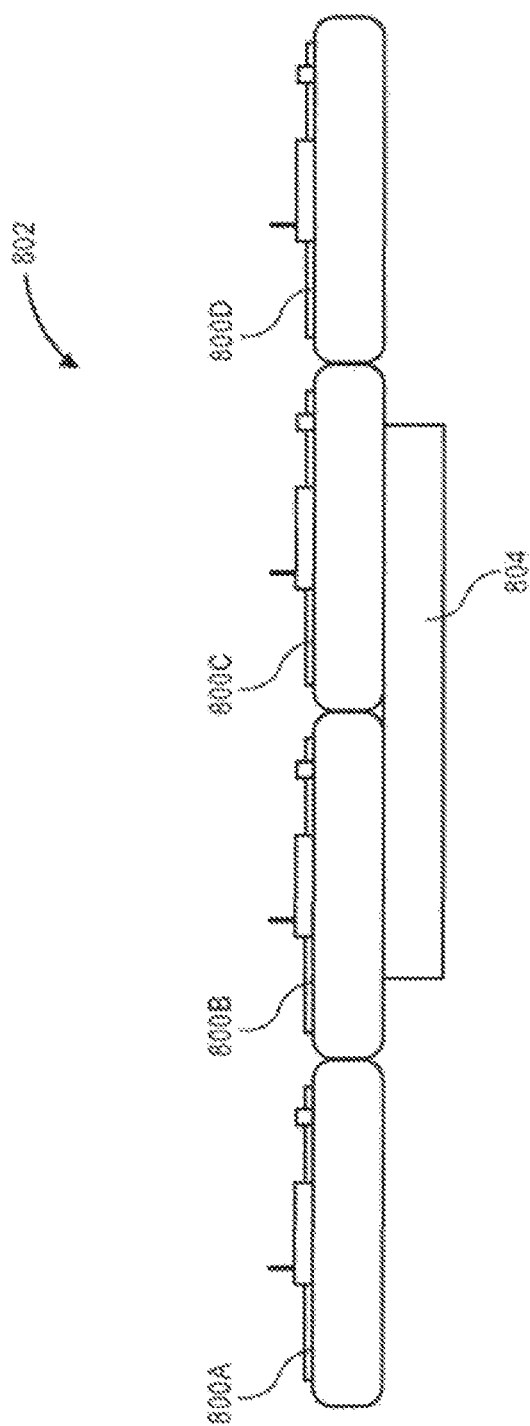
FIG. 13 depicts another side-view of a collective UAV configuration, according to an implementation.

FIG. 13 depicts another side-view of a collective UAV 802 configuration, according to an implementation. In this example, two of the UAVs 800B, 800C are coupled to a single payload 804 and two other UAVs 800A, 800D are coupled to UAVs 800B, 800C, but do not have any coupled payloads. In this example, the payload 804 is heavier than a single UAV can aerially transport, so two UAVs 800B, 800C are coupled to form a collective UAV that is coupled to the payload 804 to enable aerial transport of the payload 804. Likewise, the delivery destination is beyond the range that two coupled UAVs 800B, 800C can reach under their own power so two additional UAVs 800A, 800D are coupled with the UAVs 800B, 800C to form the collective UAV 802 to enable aerial transport of the payload 804. In such an example, the collective UAV may aerially navigate the payload to a delivery area. When the collective UAV 802 reaches the delivery area, the two UAVs 800B, 800C may decouple from the other two UAVs 800A, 800D to complete delivery of the payload 804 to a delivery destination. After the payload is delivered, the two UAVs 800B, 800C may recouple with the two UAVs 800A, 800D to aerially navigate together to another location.

Decoupling one or more of the UAVs from the collective UAV to complete delivery of the item improves the safety around the delivery destination and increases the agility of the UAV or collective UAV as it delivers the item to the delivery destination. For example, if there are numerous UAVs coupled to form a collective UAV, the collective UAV may be several feet wide. For example, referring again to FIG. 9, if each UAV 400 is approximately two feet wide by approximately two feet long, the collective UAV 402 will be approximately ten feet wide by approximately eight feet long. As another example, referring to FIG. 10, if each UAV 500 is approximately two feet wide by approximately two feet long, the collective UAV 502 will be approximately four feet wide by approximately four feet long by approximately four feet tall.

While the collective UAV configuration improves visibility and safety while the UAV is at high altitudes by making it more visible to other aircraft, such a large configuration may not be desirable at low altitudes during item delivery. For example, if a user has ordered an item and specified a location in the backyard of their home as the delivery destination, it may be dangerous to attempt to deliver the item with a collective UAV that is approximately ten feet wide by eight feet long. In contrast, delivery with a single UAV that is approximately two feet wide by two feet long may be much safer.

Figure 14:
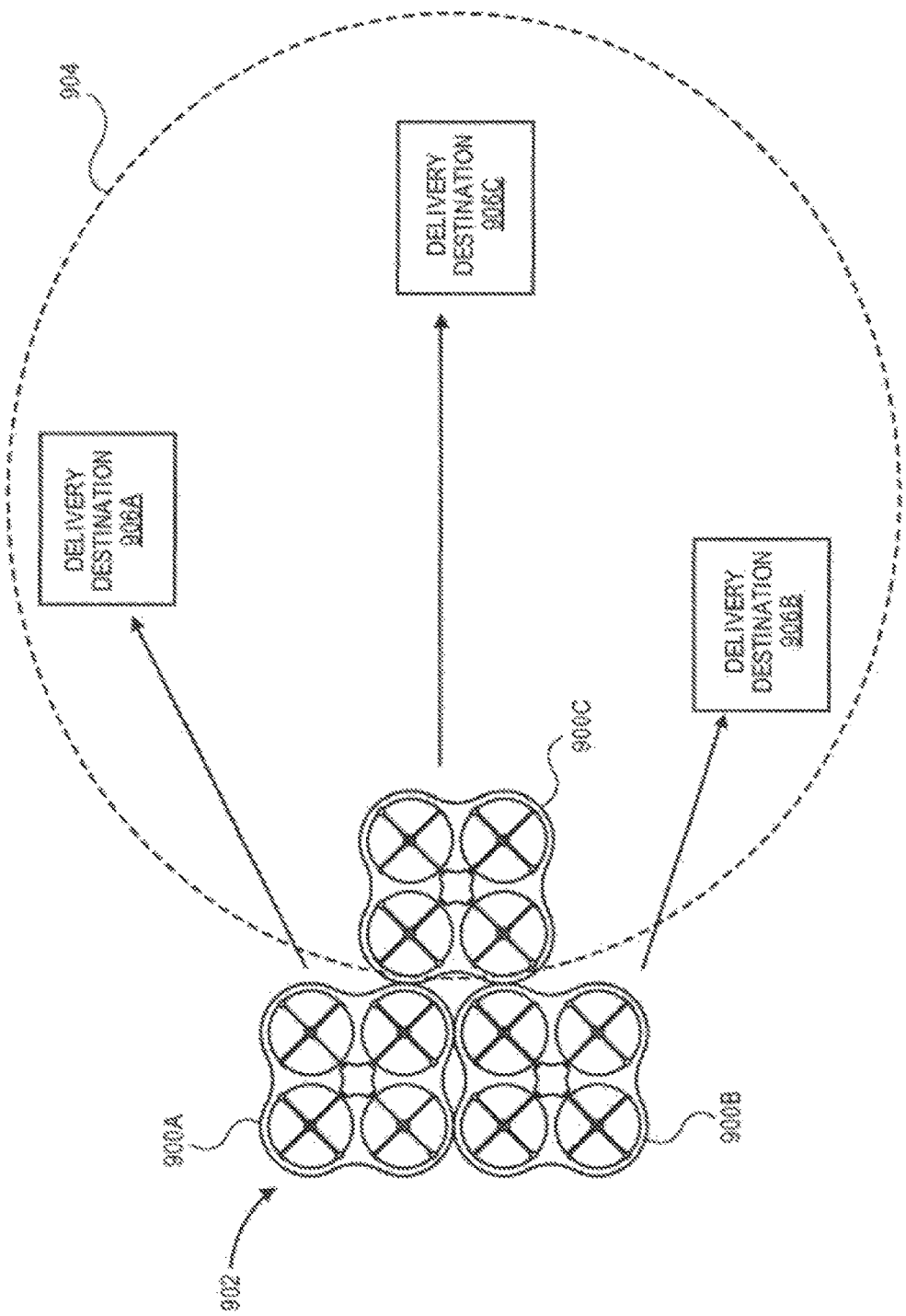
FIG. 14 depicts a top-down view of a collective UAV arriving at a delivery area, according to an implementation.

Continuing with the above examples, FIG. 14 depicts a top-down view of a collective UAV 902 arriving at a delivery area 904, according to an implementation. As the collective UAV 902 arrives at the delivery area 904, the UAVs 900A, 900B, 900C may decouple and complete delivery of payload carried by the UAV to a delivery destination 906. For example, UAV 900A may decouple from the collective UAV 902 and complete delivery of a payload to delivery destination 906A. UAV 900B may decouple from the collective UAV 902 and complete delivery of a payload to delivery destination 906B. Likewise, UAV 900C may decouple from the collective UAV and complete delivery of a payload to delivery destination 906C.

While this example shows all of the UAVs 900 of the collective UAV 902 decoupling from the collective UAV to deliver a payload to a delivery destination within the delivery area 904, in other implementations, one or more of the UAVs of the collective UAV 902 may not be delivering a payload to a delivery destination within the delivery area. For example, some UAVs of the collective UAV 902 may be aerially navigating past the delivery area 904 to a second delivery area to complete delivery of payloads to delivery destinations within that second delivery area. As another example, some of the UAVs of the collective UAV may only provide support for the aerial transport of the collective UAV and may not carry any payload for delivery. For example, some of the UAVs may carry as a payload additional power modules that may be utilized by the collective UAV to extend the flight duration and/or distance of the collective UAV. As another example, one of the UAVs may be configured as a master UAV of the collective UAV and be configured to aid in the aerial navigation of the collective UAV to the delivery area.

Figure 15:
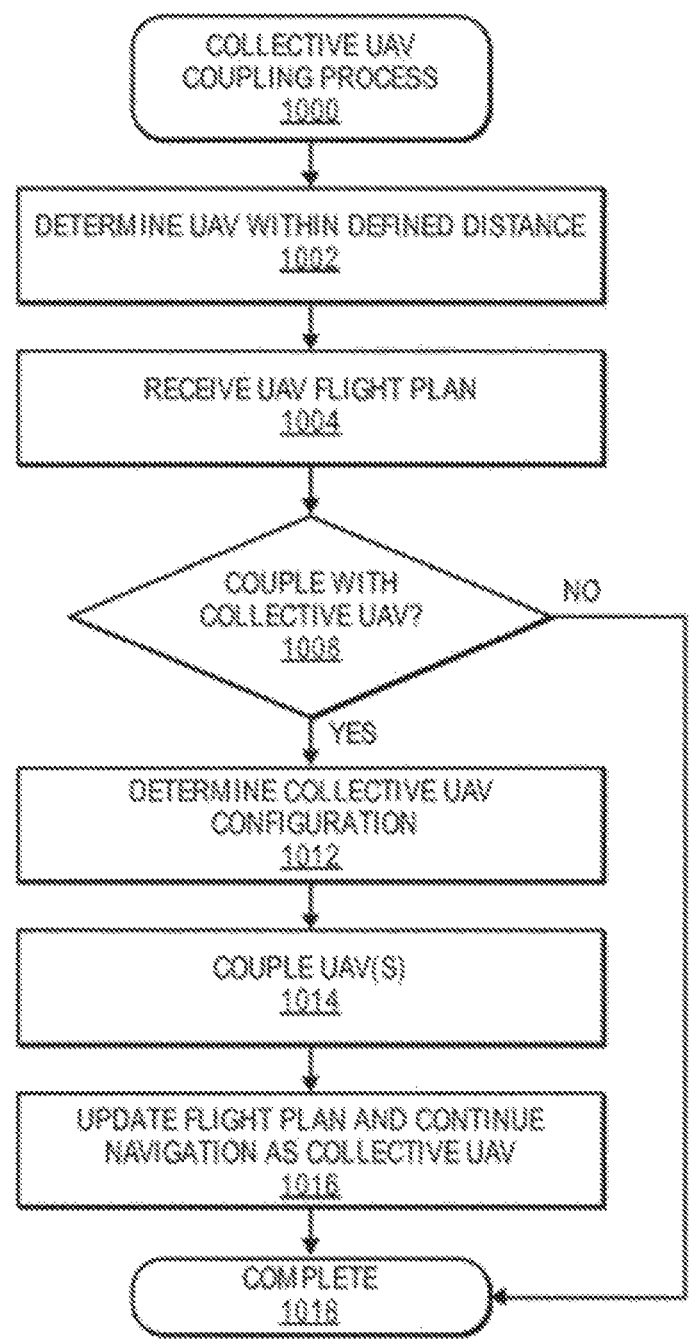
FIG. 15 is a flow diagram of an example collective UAV coupling process, according to an implementation.

FIG. 15 is a flow diagram of an example collective UAV coupling process 1000, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 20:
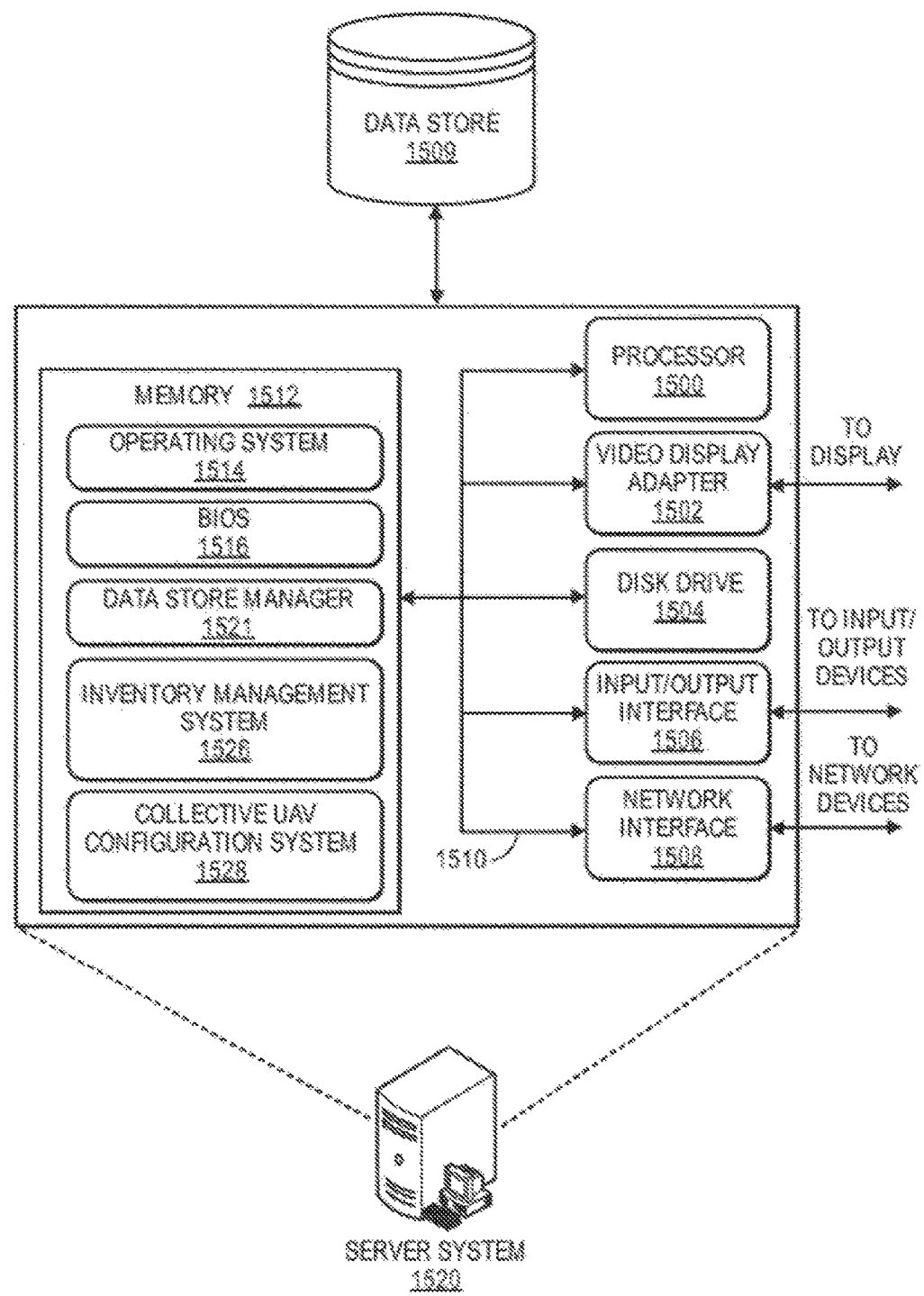
FIG. 20 is a block diagram of an illustrative implementation of a server system that may be used with various implementations.

The example process 1000 may be performed by a UAV, a collective UAV, and/or the collective UAV configuration system 1528 (FIG. 20). While the example discussed below with respect to FIG. 15 describes two UAVs, in other implementations, the example process may be used with a UAV and a collective UAV, or two collective UAVs.

The example process 1000 begins by determining a first UAV within a defined distance of a second UAV, as in 1002. The defined distance may be any defined distance between UAVs (e.g., one mile). Upon determination that the first UAV is within a defined distance of the second UAV, flight plans of the UAV(s) is received, as in 1004. For example, the two UAVs may each transmit flight plans. Alternatively, the collective UAV configuration system may periodically receive and/or determine flight plans for the UAVs.

Based on the flight plans, a determination is made as to whether the flight plans of the two UAVs are complementary and whether the two UAVs should be coupled to form a collective UAV, as in 1008. For example, if both flight plans are similar, in a similar direction, toward a similar destination (e.g., delivery area, materials handling facility), it may be determined that the flight plans of the two UAVs are complementary. Likewise, it may be determined that the UAVs should couple if they are both capable of coupling to one another, if there is sufficient distance remaining in their respective flight plans that coupling will be beneficial, etc. Other factors may also be considered in determining whether the UAVs should couple. For example, the net energy that will be saved by coupling the UAVs into a collective UAV may be estimated and considered, the increased visibility of the collective UAV may be considered, the lifting capacity of the collective UAV may be considered, etc.

If it is determined that either the flight plans are not complementary and/or that the two UAVs should not couple, the example process 1000 completes, as in 1018. However, if it is determined that the flight plans are complementary and that the UAVs should couple, a collective UAV configuration is determined, as in 1012. As discussed above, any collective UAV configuration may be determined.

Upon determining the collective UAV configuration, the first UAV and the second UAV couple to form a collective UAV according to the determined collective UAV configuration, as in 1014. The flight plans are also updated or a single flight plan for the collective UAV is determined based on the destinations of each UAV, as in 1016. For example, if the two UAVs are navigating to different destinations that are separated by a distance, a collective UAV flight plan may be determined that causes that collective UAV to aerially navigate to a point between the two destinations before the two UAVs decouple and complete navigation independently to the respective destinations. In some implementations, the point between the destinations may be a midpoint. In other implementations, the point between the destinations may be determined based on the location of the destinations, the power and navigation capabilities of the UAVs, the delivery time for the UAVs, etc. For example, a first UAV may have more power remaining than a second UAV so the flight plan may instruct the collective UAV to navigate toward the destination of the first UAV and for the second UAV to decouple at a point along the flight plan to complete navigation to the destination of the second UAV.

Figure 16:
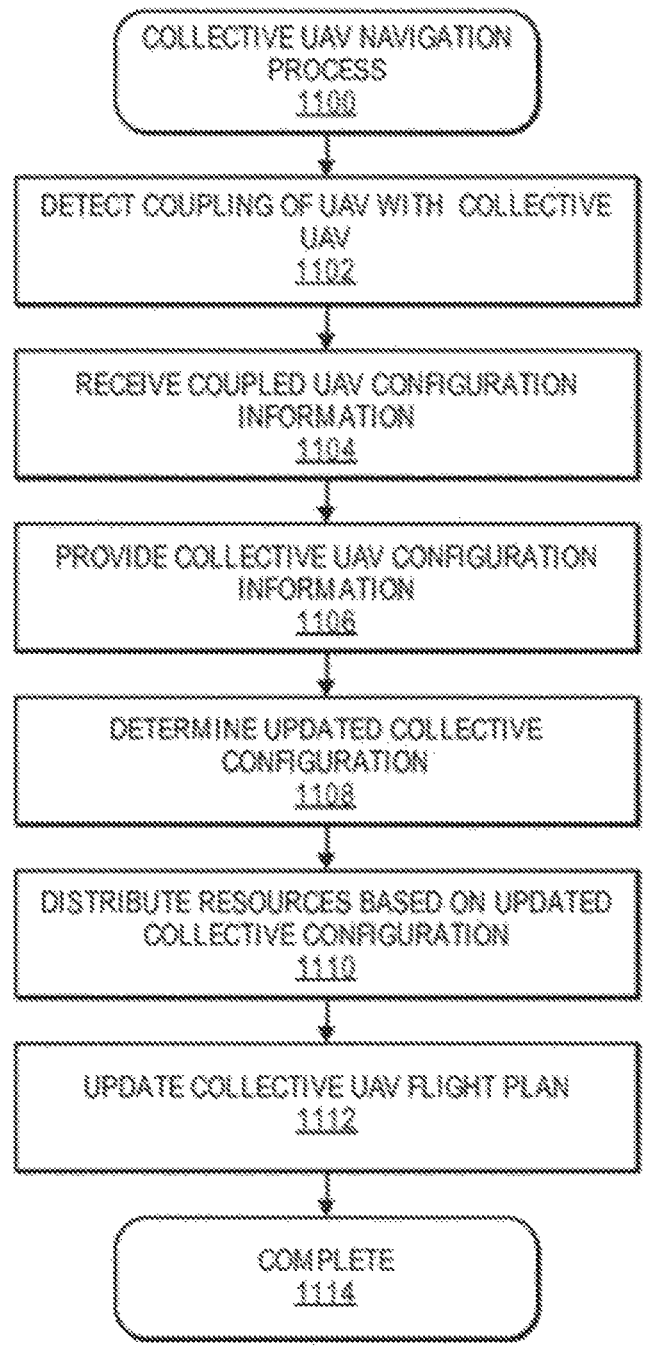
FIG. 16 is a flow diagram of an example collective UAV navigation process, according to an implementation.

FIG. 16 is a flow diagram of an example collective UAV navigation process 1100, according to an implementation. The example process 1100 begins by detecting a coupling of a UAV with the collective UAV, as in 1102. As discussed above with respect to FIG. 15, a UAV may be instructed to couple with the collective UAV according to a collective UAV configuration. Once the UAV couples with the collective UAV, the coupling is detected by at least one other UAV of the collective UAV. For example, a first UAV of the collective UAV to which a second UAV couples may determine that the second UAV has coupled with the collective UAV.

Upon coupling, the UAV configuration information of the coupled UAV is received from the coupled UAV, as in 1104. The UAV configuration information may include a UAV identifier, navigation information, power supply capabilities, motor and propeller configuration, weight of the UAV and/or payload, the location of the UAV's sensors, etc. In addition to receiving UAV configuration information from the coupled UAV, the collective UAV configuration information may be provided to the coupled UAV, as in 1106. The collective UAV configuration information may identify, for example, the navigation information of the collective UAV, operating parameters, the configuration of the collective UAV, the sensor locations of sensors that are being used by the collective UAV, etc.

In addition to exchanging information, the configuration of the collective UAV may be updated to include the coupled UAV, as in 1108. In addition, a determination may be made as to whether any resources should be distributed or redistributed based on the addition of a UAV to the collective UAV, as in 1110. As discussed above, one or more resources (e.g., power, motors/propellers, control systems, etc.) may be shared among multiple UAVs of a collective UAV. In some implementations, UAVs on the perimeter of a collective UAV may operate their motors to provide the lifting force to aerially navigate the collective UAV. In such an implementation, the rotational speed of motors of internal UAVs and/or the internal motors of perimeter UAVs may be reduced or terminated to conserve power. Accordingly, when a UAV couples with a collective UAV, it may be determined whether resources are to be distributed or redistributed. For example, the UAV that coupled with the collective UAV may be instructed to continue rotating its motors and propellers to provide lift and another UAV may be instructed to reduce or terminate the rotation of its motors and corresponding propellers.

In addition to distributing or redistributing the resources of the collective UAV, the flight plan of the collective UAV is updated, as in 1112. For example, the heading of the collective UAV may be adjusted to account for the destination of the added UAV and/or may be adjusted based on the power capabilities of the added UAV. The example process 1100 then completes, as in 1114.

Figure 17:
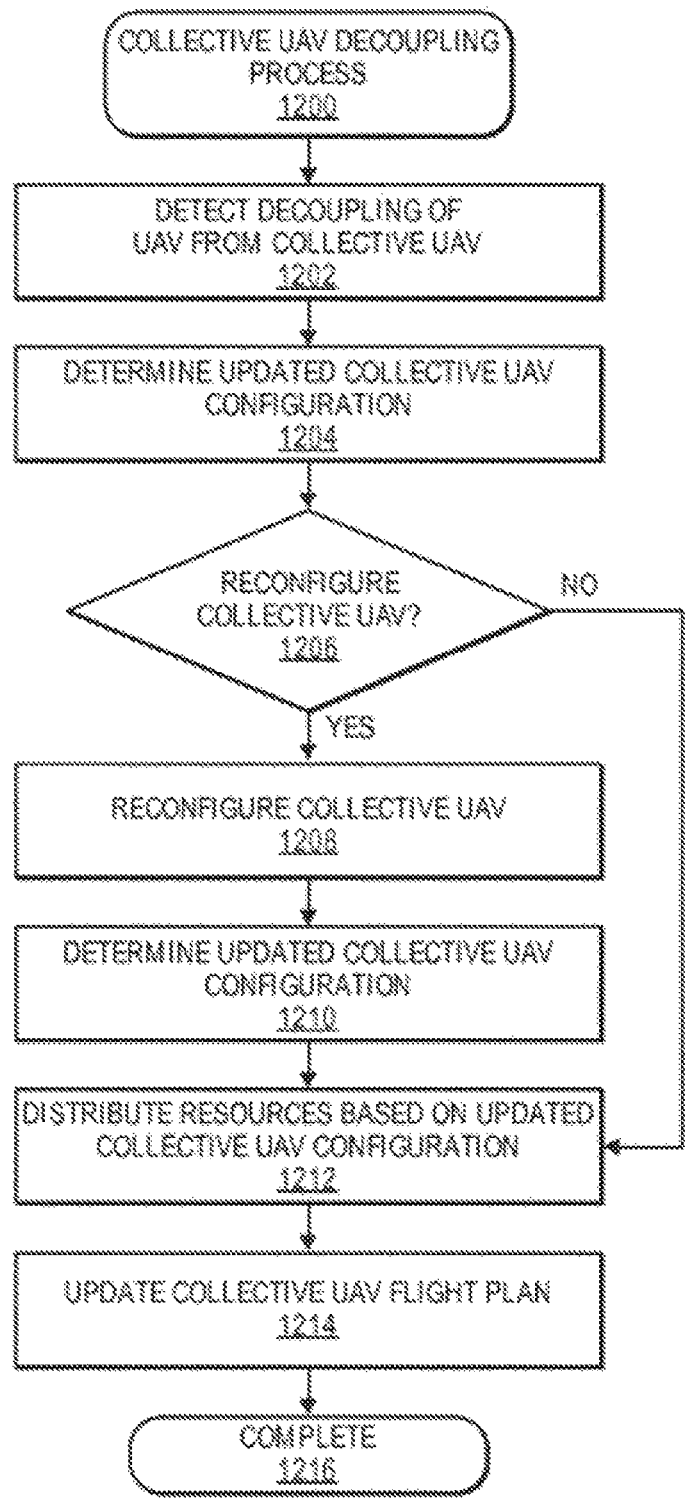
FIG. 17 is a flow diagram of a collective UAV decoupling process, according to an implementation.

FIG. 17 is a flow diagram of a collective UAV decoupling process 1200, according to an implementation. The example process 1200 begins when a decoupling of a UAV from the collective UAV is determined, as in 1202. As discussed above with respect to FIGS. 6 and 9, a UAV may decouple from the collective UAV to, for example, complete delivery of a payload to a delivery destination. Once the UAV decouples from the collective UAV, the decoupling is detected by at least one other UAV of the collective UAV. For example, a first UAV of the collective UAV from which a second UAV decoupled may determine that the second UAV has decoupled from the collective UAV. Likewise, the second UAV may provide a notification that it is decoupling from the collective UAV.

Upon decoupling, the updated collective UAV configuration is determined for the collective UAV, as in 1204. Based on the updated collective UAV configuration, a determination is made as to whether the collective UAV should reconfigure, as in 1206. For example, as discussed above with respect to FIG. 11, if the remaining UAVs of the collective UAV may be reconfigured in a manner that provides more efficiency, power savings, etc., it may be determined that the collective UAV is to be reconfigured.

If it is determined that the collective UAV is to reconfigure, instructions are sent to the UAV that remain part of the collective UAV to complete the reconfiguration of the collective UAV, as in 1208. Once the collective UAV is reconfigured, the updated collective UAV configuration is determined, as in 1210. After either reconfiguring the collective UAV or if it is determined that the collective UAV is not to be reconfigured (block 1206), the resources of the collective UAV are distributed and/or redistributed according to the updated UAV configuration, as in 1212. As discussed above, one or more resources (e.g., power, motors/propellers, control systems, etc.) may be shared among multiple UAVs of a collective UAV. In some implementations, UAVs on the perimeter of a collective UAV may operate their motors to provide the lifting force to aerially navigate the collective UAV. In such an implementation, the rotational speed of motors of internal UAVs and/or the internal motors of perimeter UAVs may be reduced or terminated to conserve power. Accordingly, when a UAV decouples from a collective UAV, it may be determined whether resources are to be distributed or redistributed. For example, if the UAV that decoupled from the collective UAV was on the perimeter and providing lifting force for the collective UAV, it may be determined that the resources of the collective UAV need to be redistributed so that a remaining UAV can assume the responsibility of rotating its motors and corresponding propellers to provide lifting force for the collective UAV.

In addition to distributing or redistributing the resources of the collective UAV, the flight plan of the collective UAV is updated, as in 1214. For example, the heading of the collective UAV may be adjusted to account for the decoupling of the UAV. The example process 1200 then completes, as in 1216.

Figure 18:
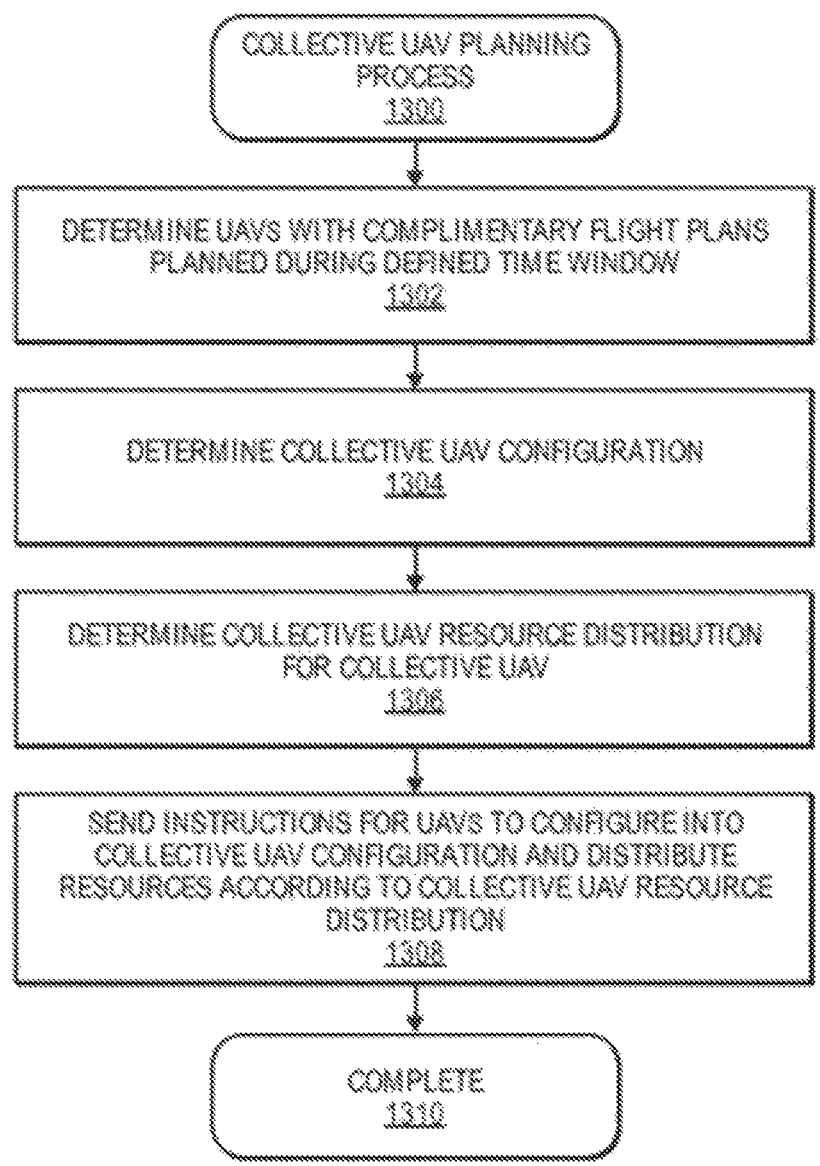
FIG. 18 is a flow diagram of a collective UAV planning process, according to an implementation.

FIG. 18 is a flow diagram of an example collective UAV planning process 1300, according to an implementation. The example collective UAV planning process 1300 may be performed by the collective UAV configuration system 1528. For example, the collective UAV configuration system 1528 may perform that collective UAV planning process while items are being packaged for delivery at a materials handling facility to determine a collective UAV that will aerially navigate from the materials handling facility to a delivery area.

The example process 1300 begins by determining UAVs that have or will have complementary flight plans during a defined time window, as in 1302. For example, items ordered by customers may each have similar delivery expectations and/or delivery times. Based on the delivery times, the distance between the materials handling facility from which the items will be transported and the speed of aerial transport, an approximate departure time can be determined for the UAVs that will transport the items. If the approximate departure time is within the defined time window and the flight plans are complementary, the UAVs may be selected for forming a collective UAV.

Based on the number of UAVs determined at block 1302, a collective UAV configuration is determined, as in 1304. The collective UAV configuration may specify the shape of the configuration and where in the collective UAV configuration each UAV is to be positioned. The positioning of the UAVs in the collective UAV configuration may be determined based on the power capabilities of the UAVs, the motors, propellers and/or lifting capabilities of the UAVs, the size of the UAVs, the payload weight of the UAVs, the location of the delivery destinations of the UAVs, etc. For example, UAVs that will decouple first from the collective UAV may be positioned on a perimeter of the collective UAV.

In addition to determining the collective UAV configuration, a collective UAV resource distribution is determined for the collective UAV, as in 1306. Similar to positioning of the UAVs in the collective UAV configuration, resource distribution may be determined based on, for example, the power capabilities of the UAVs, the motors, propellers and/or lifting capabilities of the UAVs, the size of the UAVs, the payload weight of the UAVs, the location of the delivery destinations of the UAVs, etc. For example, UAVs that will have excess power based on the distance to their delivery destination and/or payload weight, may be instructed to provide power to other UAVs of the collective UAV to enable operation of the collective UAV.

Based on the determined UAVs, determined collective UAV configuration, and determined resource distribution, instructions are sent to each UAV that is be included in the collective UAV to configure into the collective UAV and distribute resources according to the determined resource distribution, as in 1308. The instructions may be sent to the UAVs as the ordered items are packed and prepared for departure, as part of their navigation instructions, etc. Finally, the example process 1300 completes, as in 1310.

Figure 19:
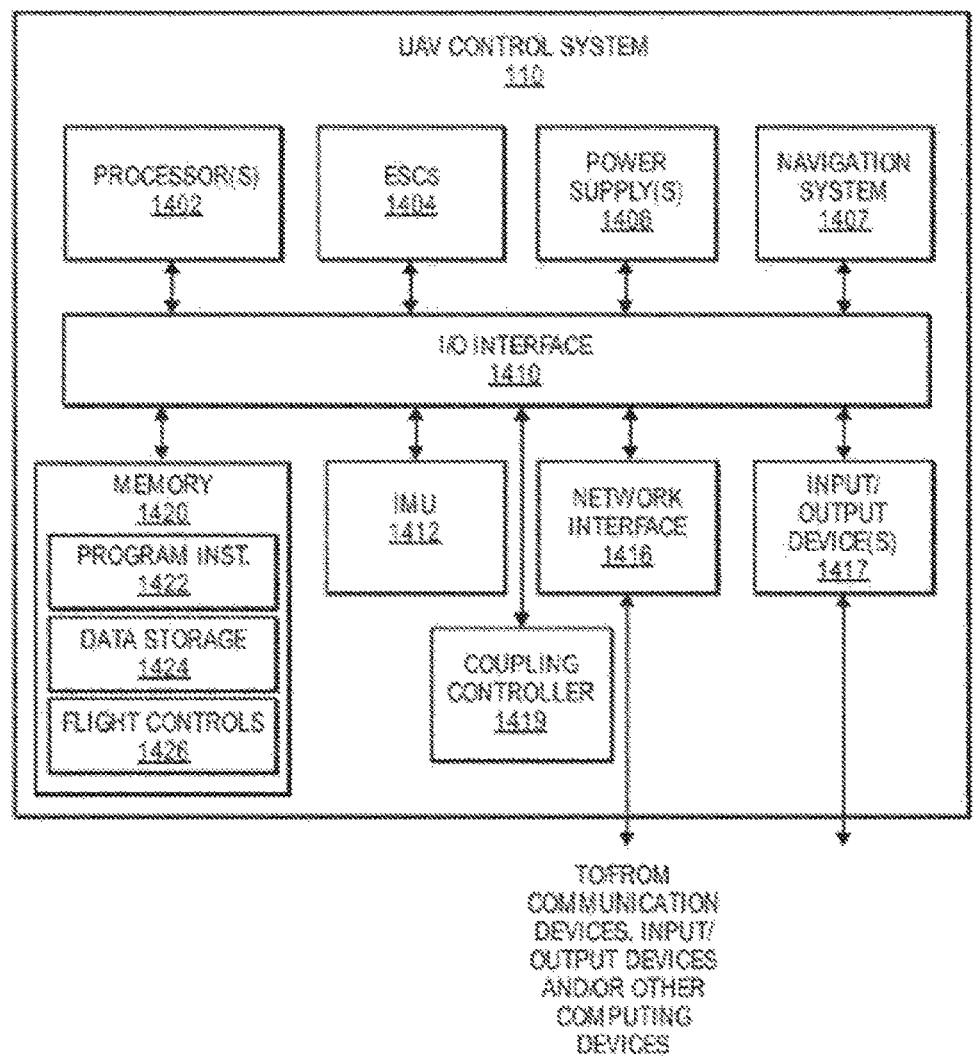
FIG. 19 is a block diagram of an illustrative implementation of a UAV control system that may be used with various implementations.

FIG. 19 is a block diagram illustrating an example UAV control system 110. In various examples, the block diagram may be illustrative of one or more aspects of the UAV control system 110 that may be used to implement the various systems and methods discussed herein and/or to control operation of the UAVs described herein. In the illustrated implementation, the UAV control system 110 includes one or more processors 1402, coupled to a memory, e.g., a non-transitory computer readable storage medium 1420, via an input/output (I/O) interface 1410. The UAV control system 110 may also include electronic speed controls 1404 (ESCs), power supply modules 1406, a navigation system 1407, and/or an inertial measurement unit (IMU) 1412. In some implementations, the IMU may be incorporated into the navigation system 1407. The UAV control system 110 may also include a coupling controller 1419 configured to control the coupling component(s) that is used to couple/decouple the UAV from other UAVs. The UAV control system 110 may also include a payload engagement controller (not shown), a network interface 1416, and one or more input/output devices 1417.

In various implementations, the UAV control system 110 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the .times.86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, flight plans, flight control parameters, collective UAV configuration information, UAV configuration information, and/or data items accessible by the processor(s) 1402. In various implementations, the non-transitory computer readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1420 as program instructions 1422, data storage 1424 and flight controls 1426, respectively. In other implementations, program instructions, data, and/or flight controls may be received, sent, or stored upon different types of computer-accessible media, such as non-transitory media, or on similar media separate from the non-transitory computer readable storage medium 1420 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 1410. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface and/or other peripheral interfaces, such as input/output devices 1417. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Also, in some implementations, some or all of the functionality of the I/O interface 1410, such as an interface to the non-transitory computer readable storage medium 1420, may be incorporated directly into the processor(s) 1402.

The ESCs 1404 communicate with the navigation system 1407 and/or the IMU 1412 and adjust the rotational speed of each lifting motor to stabilize the UAV and guide the UAV along a determined flight plan. The navigation system 1407 may include a GPS, indoor positioning system (IPS), IMU or other similar system and/or sensors that can be used to navigate the UAV 100 to and/or from a location. The payload engagement controller communicates with the actuator(s) or motor(s) (e.g., a servo motor) used to engage and/or disengage items.

The coupling controller 1419 communicates with the processor 1402 and/or other components and controls the coupling, data and/or resources sharing between the UAV and other coupled UAVs. For example, if the coupling component is an electromagnet, the coupling controller 1419 may be utilized to activate the electromagnet to couple the UAV with another UAV or deactivate the electromagnet to decouple the UAV from another UAV.

The network interface 1416 may be configured to allow data to be exchanged between the UAV control system 110, other devices attached to a network, such as other computer systems (e.g., remote computing resources), and/or with UAV control systems of other UAVs. For example, the network interface 1416 may enable communication between the UAV that includes the control system 110 and a UAV control system of another coupled UAV. In another example, the control system 110 may enable wireless communication between the UAV that includes the control system 110 and a UAV control system that is implemented on one or more remote computing resources. For wireless communication, an antenna of a UAV and/or other communication components may be utilized. As another example, the network interface 1416 may enable wireless or wired communication between numerous UAVs. For example, when UAVs are coupled, they may utilize a wired communication via the coupling components to communicate.

When UAVs are not coupled, they may utilize wireless communication to communicate. In various implementations, the network interface 1416 may support communication via wireless general data networks, such as a Wi-Fi, satellite, and/or cellular networks.

Input/output devices 1417 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 1417 may be present and controlled by the UAV control system 110. One or more of these sensors may be utilized to assist in landing as well as to avoid obstacles during flight.

As shown in FIG. 19, the memory may include program instructions 1422, which may be configured to implement the example processes and/or sub-processes described herein. The data storage 1424 may include various data stores for maintaining data items that may be provided for determining flight plans, landing, identifying locations for disengaging items, engaging/disengaging the pushing motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions. The UAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device, such as a UAV control system of a coupled UAV, and communicate with the illustrated UAV control system 110. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 110 may be transmitted to the UAV control system 110 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

FIG. 20 is a pictorial diagram of an illustrative implementation of a server system 1520 that may be used in the implementations described herein. The server system 1520 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and/or the memory 1512 may be communicatively coupled to each other by a communication bus 1510.

The video display adapter 1502 provides display signals to a display (not shown in FIG. 20) permitting an agent of the server system 1520 to monitor and configure operation of the server system 1520 and/or to provide information (e.g., regarding collective configurations, navigation paths, etc.). The input/output interface 1506 likewise communicates with external input/output devices not shown in FIG. 20, such as a mouse, keyboard, scanner, or other input and output devices that can be operated by an agent of the server system 1520. The network interface 1508 includes hardware, software, or any combination thereof, to communicate with other computing devices. For example, the network interface 1508 may be configured to provide communications between the server system 1520 and other computing devices, such as that of a materials handling facility, delivery location, and/or UAV, via a network.

The memory 1512 generally comprises random access memory (RAM), read-only memory (ROM), flash memory, and/or other volatile or permanent memory. The memory 1512 is shown storing an operating system 1514 for controlling the operation of the server system 1520. A binary input/output system (BIOS) 1516 for controlling the low-level operation of the server system 1520 is also stored in the memory 1512.

The memory 1512 additionally stores program code and data for providing network services to UAVs, materials handling facilities, the inventory management system 1526, and/or the collective UAV configuration system 1528. The program instructions enable communication with a data store manager application 1521 to facilitate data exchange between the data store 1509, the inventory management system 1526 and/or the collective UAV configuration system 1528.

As used herein, the term "data store" refers to any device or combination of devices capable of storing, accessing, and retrieving data, which may include any combination and number of data servers, databases, data storage devices and data storage media, in any standard, distributed or clustered environment. The server system 1520 can include any appropriate hardware and software for integrating with the data store 1509 as needed to execute aspects of one or more applications for a collective UAV, materials handling facility, delivery location, collective UAV configuration system 1528, and/or the inventory management system 1526.

The data store 1509 can include several separate data tables, databases or other data storage mechanisms and media for storing data relating to a particular aspect. For example, the illustrated data store 1509 includes mechanisms for maintaining information related to operations, inventory, maps, GPS data, etc., which can be used to generate and deliver information to one or more UAVs, the inventory management system 1526, and/or the collective UAV configuration system 1528. It should be understood that there might be additional aspects that can be stored in the data store 1509 and that additional data stores beyond the one illustrated may be included. For example the data store 1509 may maintain collective UAV configurations and information relating to efficiency, flight duration, etc., of UAVs when coupled according to each collective UAV configuration. The data store 1509 is operable, through logic associated therewith, to receive instructions from the server system 1520 and obtain, update or otherwise process data in response thereto.

The memory 1512 may also include the inventory management system 1526, discussed above. The inventory management system 1526 may be executable by the processor 1500 to implement one or more of the functions of the server system 1520. In one implementation, the inventory management system 1526 may represent instructions embodied in one or more software programs stored in the memory 1512. In another implementation, the inventory management system 1526 can represent hardware, software instructions, or a combination thereof.

The memory 1512 may also include the collective UAV configuration system 1528, discussed above. The collective UAV configuration system 1528 may be executable by the processor 1500 to implement one or more of the functions of the server system 1520. In one implementation, the collective UAV configuration system 1528 may represent instructions embodied in one or more software programs stored in the memory 1512. In another implementation, the collective UAV configuration system 1528 can represent hardware, software instructions, or a combination thereof.

The server system 1520, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction in FIG. 20 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, systems, and processes as illustrated in the figures and described herein represent example implementations. The methods, systems, and processes may be implemented in software, hardware, or a combination thereof in other implementations. Similarly, the order of any process may be changed and various elements may be added, reordered, combined, omitted, modified, etc., in other implementations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A secure remote operation and actuation system, comprising:
   one or more unmanned aerial vehicles;
   a remote input receptor comprising a user interface that receives one or more user inputs from a user; and
   a cloud-based network storing one or more acceptable inputs and comprising a network device that obtains the one or more user inputs from the remote input receptor,
   wherein the network device obtains the one or more user inputs from the remote input receptor while the user is using the user interface,
   wherein the cloud-based network compares the one or more user inputs to the one or more acceptable inputs and wherein, as the one or more user inputs are found acceptable, the cloud-based network performs an operation corresponding to the one or more unmanned aerial vehicles.

2. The secure remote operation and actuation system of claim 1, wherein the one or more acceptable inputs comprise one or more authorization codes authorizing the operation corresponding to the one or more unmanned aerial vehicles.

3. The secure remote operation and actuation system of claim 2, wherein the one or more user inputs comprise a user code corresponding to one or more of the authorization codes.

4. The secure remote operation and actuation system of claim 1, wherein the one or more user inputs comprise one or more instructions for the operation.

5. The secure remote operation and actuation system of claim 4, wherein the instructions comprise delivery instructions for a payload.

6. The secure remote operation and actuation system of claim 5, wherein the delivery instructions comprise a payload pick-up location.

7. The secure remote operation and actuation system of claim 5, wherein the delivery instructions comprise a payload drop-off location.

8. The secure remote operation and actuation system of claim 7, wherein the payload drop-off location comprises an enclosure having an access barrier, and wherein the delivery instructions further comprise instructions for delivering the payload past the access barrier and into the enclosure.

9. The secure remote operation and actuation system of claim 8, wherein the access barrier comprises a wireless actuation mechanism, and wherein the delivery instructions comprise a radio frequency transmission profile corresponding to the wireless actuation mechanism, wherein the radio frequency transmission profile comprises one or more of ZigBee, Z-Wave, Bluetooth, Wi-Fi, or sub-1 GHz frequency communication.

10. The secure remote operation and actuation system of claim 8, wherein the access barrier comprises a wireless locking mechanism, and wherein the delivery instructions comprise a radio frequency transmission profile corresponding to the wireless locking mechanism, wherein the radio frequency transmission profile comprises one or more of ZigBee, Z-Wave, Bluetooth, Wi-Fi, or sub-1 GHz frequency communication.

11. The secure remote operation and actuation system of claim 5, wherein the delivery instructions comprise one or more of a payload weight, a payload shape, or one or more payload length dimensions.

12. The secure remote operation and actuation system of claim 1, comprising two or more unmanned aerial vehicles.

13. The secure remote operation and actuation system of claim 12, wherein the two or more unmanned aerial vehicles are joined to form a collective unmanned aerial vehicle.

14. The secure remote operation and actuation system of claim 1, wherein the instructions comprise instructions for an unmanned aerial vehicle relay.

15. The secure remote operation and actuation system of claim 14, wherein the unmanned aerial vehicle relay instructions comprise instructions for in-flight exchanging of one or more current unmanned aerial vehicles with one or more new unmanned aerial vehicles.

16. The secure remote operation and actuation system of claim 14, wherein the unmanned aerial vehicle relay instructions comprise:
    coupling one or more support unmanned aerial vehicles to the one or more current unmanned aerial vehicles in-flight;
    removing one or more depleted energy storage cartridges corresponding to the one or more current unmanned aerial vehicles in-flight; and
    replacing one or more charged energy storage cartridges on the one or more unmanned aerial vehicles in-flight.

17. The secure remote operation and actuation system of claim 14, wherein the unmanned aerial vehicle relay instructions comprise recharging one or more depleted energy storage cartridges corresponding to the one or more unmanned aerial vehicles in-flight.

18. The secure remote operation and actuation system of claim 1, wherein the operation comprises real-time directional steering of the one or more unmanned aerial vehicles from the remote input receptor via the cloud-based network.

19. The secure remote operation and actuation system of claim 1, wherein the operation comprises real-time monitoring of a secured enclosure.

20. The secure remote operation and actuation system of claim 1, wherein at least one of the one or more unmanned aerial vehicles comprises a wireless transmitter, wherein the wireless transmitter communicates using one or more of ZigBee, Z-Wave, Bluetooth, Wi-Fi, or sub-1 GHz frequency communication.

* * * * *